US009317678B2

(12) United States Patent
Smart et al.

(10) Patent No.: US 9,317,678 B2
(45) Date of Patent: Apr. 19, 2016

(54) SYSTEM AND METHOD FOR MANAGING LOGINS IN A NETWORK INTERFACE

(71) Applicant: Emulex Corporation, Costa Mesa, CA (US)

(72) Inventors: James Smart, Windham, NH (US); Narayan Ayalasomayajula, Sacramento, CA (US); Vuong Nguyen, Aliso Viejo, CA (US); Jeffrey Beckett, San Clemente, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/315,897

(22) Filed: Jun. 26, 2014

(65) Prior Publication Data

US 2015/0281197 A1     Oct. 1, 2015

Related U.S. Application Data

(60) Provisional application No. 61/970,117, filed on Mar. 25, 2014.

(51) Int. Cl.
| | |
|---|---|
| *G06F 21/44* | (2013.01) |
| *H04L 29/06* | (2006.01) |
| *H04L 29/08* | (2006.01) |
| *G06F 3/06* | (2006.01) |
| *H04L 12/24* | (2006.01) |

(52) U.S. Cl.
CPC .............. *G06F 21/44* (2013.01); *G06F 3/0622* (2013.01); *H04L 63/08* (2013.01); *H04L 67/1097* (2013.01); *H04L 41/28* (2013.01)

(58) Field of Classification Search
CPC ..... H04L 63/08; H04L 41/28; H04L 67/1097; G06F 21/44; G06F 21/45
See application file for complete search history.

(56) References Cited

U.S. PATENT DOCUMENTS

| | | | | |
|---|---|---|---|---|
| 6,330,628 | B1 * | 12/2001 | Motoyama | 710/105 |
| 6,356,533 | B1 * | 3/2002 | Bruno et al. | 370/252 |
| 8,051,197 | B2 | 11/2011 | Mullendore et al. | |

(Continued)

OTHER PUBLICATIONS

R. Weber, "SCSI Architecture Model-3 (SAM-3)," T10, revision-1, Mar. 16, 2002, retrieved Nov. 4, 2015 at http://citeseerx.ist.psu.edu/viewdoc/download;jsessionid=04D420969B68B1D21E0F9CFF3CAF21D1?doi=10.1.1.396.4341&rep=rep1&type=pdf.*

*Primary Examiner* — Robert Leung

(57) ABSTRACT

A system and method for managing logins and/or conducting data storage transactions, for example in a network interface. One exemplary embodiment comprises a method for interfacing a mass storage target system with a plurality of initiators. The method includes creating a data structure in local memory of a network interface chip to, at least in part, manage one or more logins; storing information comprising service parameter information m the data structure; and receiving a login request for a login comprising service parameter information. The method further includes comparing the service parameter information of the login request to the service parameter information stored in the data structure; determining, based at least in part on said comparing, to utilize the data structure to manage the login; and managing the login with the network interface chip using at least the data structure.

20 Claims, 10 Drawing Sheets

(56) References Cited

U.S. PATENT DOCUMENTS

| | | |
|---|---|---|
| 2004/0024855 A1 | 2/2004 | Tsai et al. |
| 2004/0120313 A1 | 6/2004 | Moretti et al. |
| 2005/0108551 A1* | 5/2005 | Toomey ........................ 713/185 |
| 2005/0138223 A1 | 6/2005 | Clifton et al. |
| 2005/0192967 A1 | 9/2005 | Basavaiah et al. |
| 2006/0015651 A1* | 1/2006 | Freimuth et al. .............. 709/250 |
| 2006/0112381 A1* | 5/2006 | Bayus et al. ................... 717/168 |
| 2011/0137870 A1 | 6/2011 | Feder et al. |
| 2012/0265994 A1* | 10/2012 | Jibbe ....................... G06F 21/44 713/179 |

* cited by examiner

SYSTEM AND METHOD FOR MANAGING LOGINS IN A NETWORK INTERFACE

CROSS-REFERENCE TO RELATED APPLICATIONS/INCORPORATION BY REFERENCE

This patent application is related to and claims priority from provisional patent application Ser. No. 61/1970,117 filed Mar. 25, 2014, and titled "SYSTEM AND METHOD FOR MANAGING LOGINS AND STORAGE TRANSACTIONS IN A NETWORK INTERFACE," the contents of which are hereby incorporated herein by reference in their entirety. This patent application is also related to U.S. patent application Ser. No. 14/316,233 filed concurrently herewith, and titled "SYSTEM AND METHOD FOR MANAGING STORAGE TRANSACTIONS IN A NETWORK INTERFACE," the contents of which are hereby incorporated herein by reference in their entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND

Conventional systems, for example data storage systems, may generally have memory-limited login capacity. Conventional systems, for example data storage systems, may also generally have latency issues for various transactions, for example write operations. Further limitations and disadvantages of conventional and traditional approaches will become apparent to one of skill in the art, through comparison of such approaches with the disclosure as set forth in the remainder of this application with reference to the drawings.

SUMMARY

A system and method for managing logins and/or conducting data storage transactions, for example in a network interface, substantially as shown in and/or described in connection with at least one of the figures, as set forth more completely in the claims.

DETAILED DESCRIPTION OF VARIOUS ASPECTS OF THE DISCLOSURE

The following discussion presents various aspects of the present disclosure by providing various examples thereof. Such examples are non-limiting, and thus the scope of various aspects of the present disclosure should not necessarily be limited by any particular characteristics of the provided examples. In the following discussion, the phrases "for example" and "e.g." are non-limiting and are generally synonymous with "by way of example and not limitation," "for example and not limitation," and the like.

The following discussion may at times utilize the phrase "A and/or B." Such phrase should be understood to mean A, or B, or both A and B.

The following discussion may at times utilize the phrases "operable to," "operates to," and the like in discussing functionality performed by particular hardware, including hardware operating in accordance with software instructions. The phrases "operates to," "is operable to," and the like include "operates when enabled to". For example, a module that operates to perform a particular operation, but only after receiving a signal to enable such operation, is included by the phrases "operates to," "is operable to," and the like.

Conventional systems, for example data storage systems or storage arrays, may generally have memory-limited login capacity. For example, managing logins in general, including both active and inactive logins, generally requires the utilization of memory resources. When the memory resources utilized to manage logins reside on a network interface card or more particularly on a network interface chip, the amount of such resources can be particularly limited. In such a scenario, efficient utilization of finite available memory space for managing logins is advantageous.

Accordingly, various aspects of the present disclosure may provide non-limiting examples of methods and systems for increasing the number of logins that may be managed by a system (e.g., a data storage system) without increasing the amount of memory needed for login management.

Figure 1:
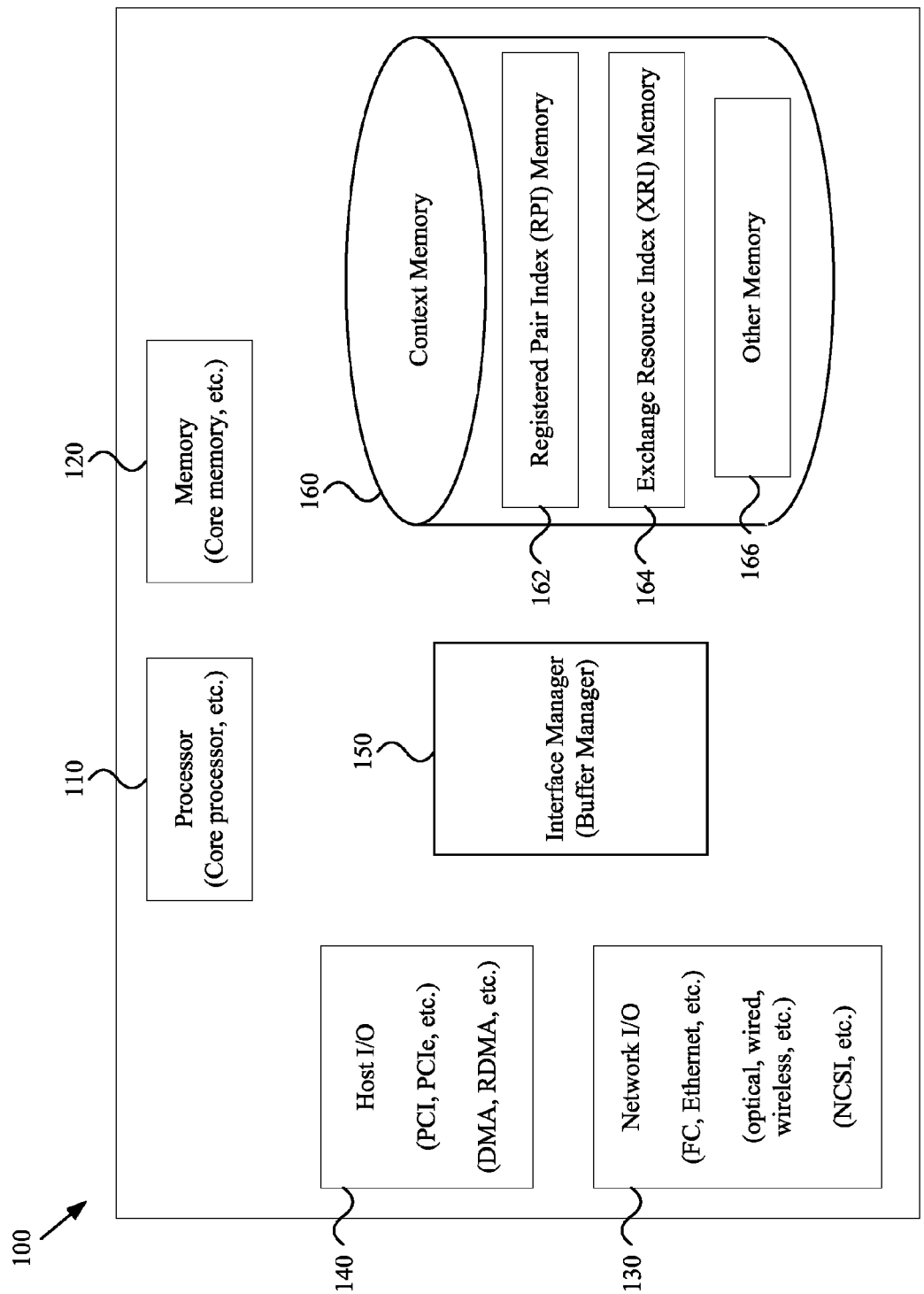
FIG. 1 is a diagram illustrating an example network interface system, in accordance with various aspects of the present disclosure.

Turning first to FIG. 1, such figure is a diagram illustrating an example network interface system 100, in accordance with various aspects of the present disclosure. The network interface system 100 may, for example, be completely contained in a single integrated circuit package. In such an embodiment, the network interface system 100 may be formed on a single semiconductor die or on multiple die placed on a common substrate and packaged in a single integrated circuit package.

In another example embodiment, the network interface system 100 may be contained in a single network interface board or module. For example, such an interface board or module may be plugged into a backplane or motherboard or a larger system (e.g., a host system). In such an embodiment, the functional blocks of the network interface system 100, discussed in more detail below, may be performed by respective integrated circuit chips or packages. Also for example, one or more of the functional blocks of the network interface system 100 may be performed by a first integrated circuit package, and one or more others of the functional blocks of the network interface system 100 may be performed by a second integrated circuit package.

The following discussion of FIG. 1 is segmented into functional modules for the sake of illustrative clarity. It should be realized that the functionality of the modules may be performed by respective separate hardware and/or software instructions, and/or may be performed by common hardware and/or common software instructions stored in volatile and/or non-volatile memory (e.g., instructions stored in a non-transitory computer or machine readable storage medium). For example, a first and second of the modules (or portions thereof) may be performed by a common processing circuit. Also for example, a first and second of the modules (or portions thereof) may share one or more software routines. Accordingly, the scope of various aspects of this disclosure should not be limited by arbitrary boundaries between hardware and/or software components.

The network interface system 100 may, for example, comprise a Host I/O module 140. The Host I/O module 140 may, for example, comprise interface hardware and/or software that operates to communicate with a host system (e.g., a host storage system) to which the network interface system 100 is coupled. The Host I/O module 140 may, for example, comprise hardware and/or software for communicating with a host in accordance with one or more communication protocols (e.g., PCI, PCIe, etc.). The Host I/O module 140 may, for example, comprise hardware and/or software for communicating with a host system using direct memory access (DMA) or remote direct memory access (RDMA), or other memory access technologies. In an implementation scenario involving an interface card, the host I/O module 140 may comprise hardware and/or software for communicating with the card bus. In an implementation scenario involving the network interface system 100 being implemented in a single integrated circuit (IC) package, the Host I/O module 140 may comprise hardware and/or software for communicating with a card bus into which a card is plugged and/or with a standard or proprietary bus on-board the card. In general, the Host I/O module 140 may comprise hardware and/or software that operate to communicate with a host system. Accordingly, the scope of various aspects of this disclosure should not be limited by characteristics of any hardware or software or host interface unless explicitly stated.

The network interface system 100 may, for example, comprise a Network I/O module 130. The Network I/O module 130 may, for example, comprise interface hardware and/or software that operate to communicate with one or more communication networks. Such networks may, for example, comprise characteristics of any one or more of a plurality of different types of networks. For example, such networks may comprise characteristics of local area networks, wide area networks, metropolitan area networks, the Internet, etc. Also for example, such networks may comprise characteristics of wired, wireless, and/or optical networks. The Network I/O module 130 may, for example, comprise hardware and/or software that operate to communicate over an optical fibre (or fiber) channel. The Network I/O module 130 may, for example, comprise hardware and/or software that operate to communicate over any of a variety of communication protocols, for example PHY protocols, MAC protocols, network protocols, transport protocols, etc. Such protocols may, for example, comprise an FC (Fibre Channel) protocol, an Ethernet protocol, an NCSI (e.g., Network Controller Sideband Interface) protocol, an iSCSI (Internet Small Computer System Interface) protocol, an FCoE (Fibre Channel over Ethernet) protocol, etc.

The network interface system 100 may, for example, comprise an Interface Manager module 150. The Interface Manager module 150 may, for example, comprise a Buffer Manager module and/or a Storage Transaction Manager module. The Interface Manager module 150 may, for example, operate to manage communication buffers, communication state machines, etc. Such communication buffers may, for example, reside in a memory local to the network interface system 100 and/or in a memory remote to the network interface system 100 (e.g., a host memory). The Interface Manager module 150 may, for example, comprise hardware and/or software that operate to manage the buffering of packets or frames received via the Host I/O module 140 or Network I/O module 130 for transmission via the Network I/O module 130 or Host I/O module 140, respectively. The Interface Manager module 150 may, for example, comprise hardware and/or software that operate to manage logins and/or that operate to manage active communications. Non-limiting examples of such login and/or communication management are provided herein, for example in the discussions of FIGS. 2-10.

The Interface Manager module 150 may, for example, be communicatively coupled to the Host I/O module 140 and the Network I/O module 130. As mentioned above, the Interface Manager module 150 may interface with the Host I/O module 140 for communicating with a host system to which the Host I/O module 140 is communicatively coupled. For example, the Interface Manager module 150 may utilize the Host I/O module 140 to communicate messages (or descriptors) with a host system and/or to perform DMA or RDMA operations with host memory.

Additionally, the Interface Manager module 150 may interface with the Network I/O module 130 for communicating with a communication network to which the Network I/O module 130 is communicatively coupled. For example, in an example scenario in which the network interface system 100 is installed in a host target of a data storage system, the Interface Manager module 150 may utilize the Network I/O module 130 to communicate with an initiator system through a communication network.

The Interface Manager module 150 may, for example, operate to manage logins to the host system. As part of such login management, the Interface Manager module 150 may utilize data structures formed in memory. Such memory may, for example, comprise a Context Memory 160 that is local to the network interface system 100 (e.g., local to an interface board or IC package implementation of the network interface system 100). As shown in the example illustrated in FIG. 1, the Interface Manager module 150 may utilize Remote Port Indicator (RPI) data structures stored in a local Context Memory 160. In particular, a portion of the Context Memory 160 may be allocated (e.g., memory-mapped) as RPI Memory 162 for the storage of RPI data structures. The RPI Memory 162 may, for example, comprise a portion of a larger Context Memory 160 and/or may comprise a memory entirely dedicated to the RPI memory.

Data structures in the Context Memory 160 may, for example, comprise any of a variety of types of information related to login management. Such types of information may, for example, comprise link service parameter information (e.g., operational parameters utilized to maintain an initiator-target nexus). In an example Fibre Channel Link Services (FCLS) implementation, such information may, for example, comprise any one or more of: FC-PH Version, Buffer-to-buffer Credit, Common Features (e.g., including Continuously increasing relative offset, Clean Address, Multiple N_Port_ID Support, Random relative offset, Virtual Fabrics bit, Valid Vendor Version Level, Multiple N_Port_ID Assignment, N_Port/F Port, BB_Credit Management, Name Server Session Started, Name Server Session Begin, E_D_TOV Resolution, Broadcast supported by Fabric, Query Data Buffer Conditions, Security bit, Clock Synchronization Primitive Capable, R_T_TOV Value, Dynamic Half Duplex Supported, SEQ_CNT/Vendor Specific, Payload Bit, etc.), BB_SC_N, Buffer-to-buffer Receive Data Field Size, Nx_Port Total Concurrent Sequences, Relative offset by Info Category, R_A_TOV, E_D_TOV Value, etc. Other communication protocols may, for example, comprise respective sets of service parameter information. The Interface Manager module 150 may utilize service parameter information to communicate with a networked device (e.g., an initiator system) that is communicating with the host (e.g., a target system). The service parameter information may, for example, be negotiated during login interaction between the host and a networked device.

The Interface Manager module 150 may also utilize data structures to manage present active exchanges. As part of such active exchange management, the Interface Manager module 150 may utilize data structures formed in memory. Such memory may, for example, comprise a Context Memory 160 that is local to the network interface system 100 (e.g., local to an interface board or IC package implementation of the network interface system 100). As shown in the example illustrated in FIG. 1, the Interface Manager module 150 may utilize Exchange Resource Index (XRI) data structures stored in a local Context Memory 160. In particular, a portion of the Context Memory 160 may be allocated (e.g., memory-mapped) as XRI Memory 164 for the storage of XRI data structures. The XRI Memory 164 may, for example, comprise a portion of a larger Context Memory 160 and/or may comprise a memory entirely dedicated to the XRI memory.

The network interface system 100 may also comprise Other Memory 166, which may be a portion of the Context Memory 160. The Other Memory 166 may, for example, be utilized for general operations, communication buffering, fault management, software, etc. As illustrated in FIG. 1, the RPI Memory 162, XRI Memory 164, and Other Memory 166 may all represent portions (for example, memory-mapped portions) of a single Context Memory 160 device, but may also be implemented on separate respective memory devices, die portions, etc. It should be noted that the Context Memory 160 may comprise one or more memory devices (or die) and one or more different types of memory (e.g., volatile and/or non-volatile).

The example network interface system 100 shown in FIG. 1 is shown with a Processor 110 and Memory 120. The Processor 110 may, for example, be a core processor that performs high-level management of system operations. The Processor 110 may also, for example, operate to perform all or a portion of any of the module functionality discussed herein. The Processor 110 may, for example, operate in accordance with software instructions stored in a memory of the interface system (e.g., the Memory 120, the Context Memory 160, etc.). For example, operation of the Host I/O module 140, Network I/O module 130, Interface Manager module 150, etc., may be performed in-whole or in-part by the Processor 110 executing software instructions. Also for example, any or all of such modules may have dedicated processors, and/or memory for software and/or operating space. Further for example, any or all of such modules may be implemented utilizing application specific integrated circuits (ASICs), for example ASIC die or ASIC packages. Accordingly, the scope of various aspects of the present disclosure should not be limited by any particular implementation details unless explicitly specified.

As mentioned previously, the example network interface system 100 may operate to perform any of a variety of interface operations. The discussion now turns to FIGS. 2-10, which show example functionality that may be performed by the network interface system 100 (or other system).

Any or all of the methods illustrated in FIGS. 2-10 and/or discussed with respect to FIGS. 2-10 may, for example, be performed or not performed based on system configuration. For example, a host utilizing an interface system (e.g., the network interface system 100 shown in FIG. 1) may communicate configuration information to the interface system, and the interface system may analyze such configuration information to determine whether to perform any or all of the methods illustrated in FIGS. 2-10, and/or discussed with regard to FIGS. 2-10, and/or portions thereof, for example the sharing of a login-management data structure by multiple remote systems. Additionally, the configuration information may also specify conditions under which the interface system is to perform the methods or portions thereof. For example, the configuration information may specify that only a particular number of remote systems (e.g., initiator or client systems) can share a login-management data structure, that only particular types of remote systems can share a login-management data structure, etc.

The above-mentioned configuration information may, for example, be communicated between the host and the interface system during system initialization (e.g., initialization of the host and/or interface system). For example, in an example scenario in which the login load to a host system is always light or always expected to be light, the host system may specify to the interface system during system initialization that a one-to-one correspondence between login-management data structures and respective remote systems (e.g., physical or logical remote systems) is utilized. Alternatively for example, in an example scenario in which the login load to a system is always high or always expected to be high, the host system may specify to the interface system that a one-to-many correspondence between login-management data structures and respective remote systems (e.g., physical or logical remote systems) is utilized. In various scenarios, a single bit of a message from the host to the interface system may be utilized to specify the one-to-one or one-to-many configuration.

Also for example, the above-mentioned configuration information may be communicated between the host and the interface system during normal or post-initialization operation (e.g., in real-time) in response to present or predicted operating conditions. For example, during system operation, the host and/or the interface system may determine whether to share a login-management data structure between multiple remote systems or whether to have a one-to-one correspondence between login-management data structures and respective remote systems. Such a determination may, for example, be based on the amount of memory (e.g., amount of Context Memory 160 of the network interface system 100) that is presently being utilized. In an example scenario, a host system (e.g., a driver routine executing on the host system) may determine that a one-to-one correspondence between login-management data structures (e.g., RPIs) and remote systems (e.g., initiator systems) is utilized until a threshold utilization level of Context Memory utilization is reached (e.g., 50% utilization, 67% utilization, 75% utilization, etc.). In such a scenario, the host system, having determined that the threshold utilization level has been reached, communicates to the interface system that a one-to-many correspondence between login-management data structures and respective remote systems is utilized.

Figure 2:
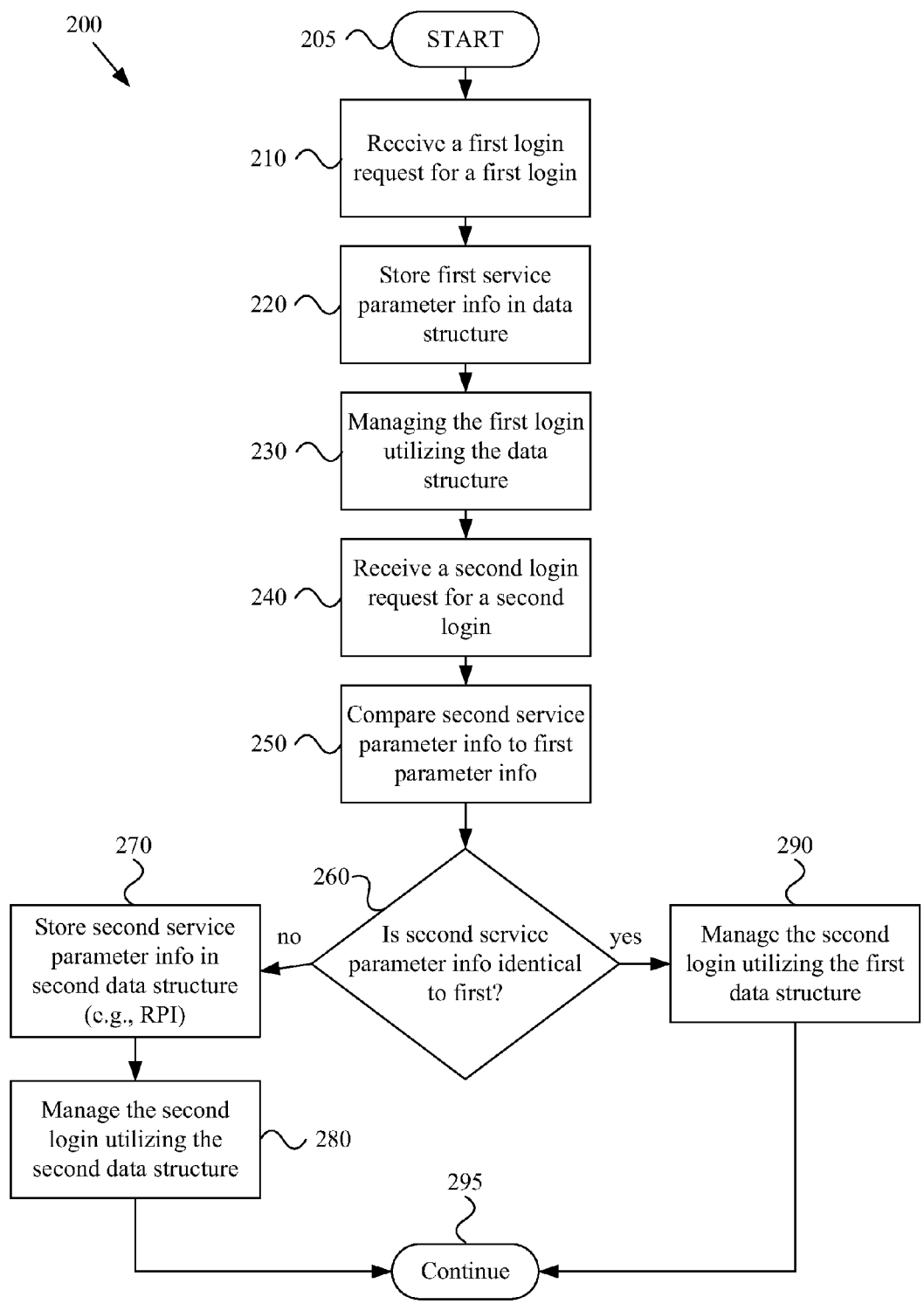
FIG. 2 shows a flow diagram showing an example method for managing system logins, in accordance with various aspects of the present disclosure.

Turning now to FIG. 2, such figure is a flow diagram showing an example method 200 for managing system logins, in accordance with various aspects of the present disclosure. The method 200, or any portion thereof, may for example be implemented by the network interface system 100 illustrated in FIG. 1 and discussed previously. The steps of the method 200 may, for example, be performed at least in part by any or all of the modules of the network interface system 100.

The method 200 may begin executing at step 205. The method 200 may begin executing in response to any of a variety of causes or conditions. For example, the method 200 may begin executing in response to an indication that a message is arriving or has arrived. Such a message may, for example, arrive from a communication network and/or from a host.

The method 200 may, at step 210, comprise receiving a first login request for a first login. For example, in a scenario in which the method 200 is being implemented in a network interface system of a storage system, step 210 may comprise receiving a login request from an initiator system that desires to interact with the storage system. For example, the received first login request may comprise a process login (or PLOGI) frame communicated from an initiator (or client) system to a target (or server) host system.

Step 210 may, for example, comprise receiving a login request from a communication network to which the network interface system is communicatively coupled (e.g., originated from an initiator system and communicated through the communication network), and forwarding the received login request to a host to which the interface system is communicatively coupled (e.g., a storage system host). In such a scenario, the received login request may comprise service parameter information, login requestor identification information, etc., for example either originating from the source of the login request and/or resulting from login service negotiations conducted between the host or interface system and the originator or source of the login request. Referring briefly to FIG. 1, the Network I/O module 130 may receive the login request, the Interface Manager module 150 may utilize the Host I/O module 140 to forward the login request to the host, and the Host I/O module 140 may receive a login control message from the host.

Step 210 may also, for example, comprise receiving a message from a host system utilizing the network interface system, where such message directs the network interface system to begin managing a login corresponding to the login request. Such a received message may, for example, comprise service parameter information, login requestor identification information, etc., for example either originating from the source of the login request, the host, and/or resulting from login service negotiations conducted between the host or interface system and the source of the login request.

In general, step 210 may comprise receiving a first login request for a first login. Accordingly, the scope of various aspects of the disclosure should not be limited by characteristics of any particular login request and/or source thereof, unless explicitly stated.

The method may, at step 220, comprise storing information in a data structure (e.g., a login-management data structure) of a network interface chip or adapter card. The data structure may, for example, have as a primary purpose the storage of information utilized to manage a login to the host system (e.g., a mass storage target system).

The information stored in the data structure (e.g., a login management data structure) may, for example, comprise service parameter information, many examples of which are provided above. The stored information may, for example, comprise any or all of the service parameter information presented previously and/or generally analogous information related to other communication protocols. For example, the stored information may comprise a set of all service parameter information for a given protocol, or a portion thereof (e.g., a set of relatively important parameters). Referring briefly back to FIG. 1, step 220 may comprise storing the information in an RPI data structure in RPI Memory 162 space in a Context Memory 160.

In an example scenario, both a host system and an interface system coupled thereto may locally maintain the stored information (e.g., service parameter information). For example, a host system (e.g., a driver thereof) may utilize such service parameter information to make operational decisions, examples of which are provided herein. In such a scenario, the host system may, for example, access the stored information in a host memory or may alternatively access the stored information from the interface system. Also for example, an interface system (e.g., a network adapter card, a network interface chip, etc.) may utilize such information to communicate with a remote system via an intervening communication network.

Also, as discussed previously with regard to FIG. 1, information related to on-going active communications may also be stored in a data structure (e.g., an active exchange data structure) of the network interface chip or adapter card. Such stored information may, for example, comprise communication state information for tracking the state of active I/O activity between the host and a particular remote system. As an example, an XRI data structure may be allocated to a respective active I/O. Referring briefly back to FIG. 1, the active I/O information may be stored in an XRI data structure in XRI Memory 164 space in the Context Memory 160.

Further, as discussed previously with regard to FIG. 1, various additional operational information may be stored in Other Memory 166 space in the Context Memory 160.

Step 220 may, for example, be performed by an interface system in response to a message (e.g., a descriptor message) received from a host system. The message may, for example, direct the interface system to prepare a login-management data structure for a remote system. In an example scenario, the message from the host to the interface system may comprise the information (e.g., the service parameter information) that is to be stored in the login-management data structure. Referring briefly to FIG. 1, step 220 may be performed by the Interface Manager module 150 storing information in an RPI data structure in the RPI Memory space 162 of the Context Memory 160 in response to a message received from the host via the Host I/O module 140.

In general, step 220 may comprise storing information in a data structure (e.g., a login-management data structure) of a network interface chip or adapter card. Accordingly, the scope of various aspects of the disclosure should not be limited by characteristics of any particular manner of storing or by characteristics of any particular type of information unless explicitly stated.

The method 200 may, at step 230, comprise managing the first login utilizing the data structure (e.g., a login management data structure). As discussed previously, a login-management data structure (e.g., an RPI data structure) may comprise service parameter information that corresponds to a particular login. In such a scenario, step 230 may for example comprise analyzing the service parameter information stored in the login-management data structure to determine how to communicate with a remote station via an intervening communication network. In an example scenario in which there is a one-to-one correspondence between a login-management data structure and a remote system, the login-management data structure may comprise identification information corresponding to the remote system (e.g., a network address, port ID, node ID, device ID, system ID, etc., depending on the implementation).

In an example scenario, a host system may communicate a message (e.g., a descriptor) to the interface system comprising information that is to be communicated by the interface system in a message transmitted to a remote system (e.g., to an initiator system). The message from the host may, for example, comprise information identifying the login-management data structure (e.g., identifying an RPI) to be utilized by the interface system for the communication to the remote system. In an example scenario in which there is a one-to-one mapping between login-management data structures and the remote system, the interface system may access the identified login-management data structure to obtain all of the information needed to communicate the message to the remote system. Many examples of service parameter information were provided previously. In such a scenario, the interface system may access device identification or network addressing information from the login-management data structure.

In another example scenario, discussed herein, the message from the host to the interface system may comprise information identifying both the login-management data structure and the remote system (e.g., a network address, port ID, node ID, device ID, system ID, etc., depending on the implementation). In such a scenario, a single login-management data structure may be utilized by the interface system for communicating with a plurality of remote systems. For example, the service parameter information stored in a single login-management data structure may be utilized to manage logins for a plurality of remote systems or initiators.

Though the previous examples addressed managing communication of an outbound message from the host to a remote system, the principles also apply to receiving incoming messages from remote systems, which the interface system may then analyze and/or forward up to the host system. In an example scenario, a message may be received at the interface module from the remote system (e.g., via a network I/O module), the message may then be analyzed for compliance with communication rules (e.g., by an interface manager module), and the message may be forwarded to the host system (e.g., via a host I/O module). The message may, for example, be communicated to the host system along with information identifying the login-management data structure and/or information identifying the remote system.

In an example scenario where the communication protocol includes maintaining a concurrent sequence count between an initiator and a target (e.g., where a limit may be set), step 230 may comprise managing a concurrent sequence count between the initiator and the target. In such an example scenario, the network interface system 100 (e.g., an interface manager module thereof) may ensure that the limit is not being violated.

Referring briefly to FIG. 1, in an example implementation of step 230, the Interface Manager module 150 may operate to interact with the RPI Memory 162 space in the Context Memory 160 to utilize and/or manipulate information in an RPI data structure that corresponds to a particular login (e.g., for a particular initiator system). For example, the network interface system 100 may receive an outgoing message from a host via the Host I/O module 140, where the outgoing message comprises information from which an RPI data structure can be identified. The Interface Manager module 150 may then analyze the received message from the host to identify which RPI data structure to utilize and access service parameter information and/or addressing information stored in the identified RPI data structure to determine how to communicate the received message to the remote system. The Interface Manager module 150 may then utilize the Network I/O module 130 to transmit the received message to the remote system. As shown below, in a scenario in which the received message from the host also includes remote source identification information, the Interface Manager module 150 may also use the remote source identification information to properly direct the outgoing message to the remote system.

As discussed previously, an active exchange data structure (e.g., an XRI data structure) may be maintained to manage the state of an on-going communication exchange. In the above scenario in which the interface system is communicating information with a remote system, the interface system (e.g., the Interface Manager module 150 of FIG. 1) may analyze and/or manipulate the information stored in an active exchange data structure corresponding to the on-going communication exchange. In a scenario in which a new active exchange data structure is needed, the interface system may instantiate a new active exchange data structure (e.g., the Interface Manager module 150 may instantiate a new XRI data structure in the XRI Memory space 164 of the Context Memory 160).

In general, step 230 may comprise managing the first login utilizing the data structure (e.g., a login-management data structure, a login-management portion of a data structure, etc.). Accordingly, the scope of various aspects of the disclosure should not be limited by characteristics of any particular manner of managing a login, any particular type of data structure, any manner of communicating, etc., unless explicitly stated.

The method 200 may, at step 240, comprise receiving a second login request for a second login. Step 240 may, for example, share any or all characteristics with step 210 discussed previously, albeit with regard to a second login.

Also, for example, in a scenario in which the method 200 is being implemented in a network interface of a storage system, step 240 may comprise receiving a second login request from an initiator system or second initiator system that desires to interact with the storage system. For example, the received second login request may comprise a process login (or PLOGI) frame communicated from a second initiator system to a target host system.

Step 240 may, for example, comprise receiving a second login request from a communication network to which the interface system is communicatively coupled (e.g., originated from a second remote system (e.g., an initiator system) and communicated through the communication network), and forwarding the received second login request to a host to which the interface system is communicatively coupled (e.g., a storage system host). In such a scenario, the received second login request may comprise service parameter information, login requestor identification information, etc., for example either originating from the source of the second login request and/or resulting from login service negotiations conducted between the host or interface system and the originator or source of the second login request. Referring briefly to FIG. 1, the Network I/O module 130 may receive the second login request and pass on the second login request to the Interface Manager module 150, the Interface Manager module 150 may analyze the received second login request, and the Interface Manager module 150 may utilize the Host I/O module 140 to forward the login request to the host.

Step 240 may also, for example, comprise receiving a message from a host system utilizing the network interface system, where such message directs the network interface system to begin managing a second login corresponding to the second login request. Such a received message may, for example, comprise service parameter information, login requestor identification information, etc., for example either originating from the source of the login request, the host, and/or resulting from login service negotiations conducted between the host or interface system and the source of the second login request.

In general, step 240 may comprise receiving a second login request for a second login. Accordingly, the scope of various aspects of the disclosure should not be limited by characteristics of any particular login request and/or source thereof, unless explicitly stated.

The method 200 may, at step 250, comprise comparing second service parameter information corresponding to the second login to first service parameter information corresponding to the first login. Step 250 may, for example, be performed by a host driver routine executing on a host and/or may be performed by an interface system. Note that service parameter information may be stored in host memory for convenient host access, or might only be stored in memory of the interface system and retrieved by the host as needed.

As discussed previously, at step 220, a first login-management data structure was populated with information comprising first service parameter information corresponding to the first login request received at step 210. Step 250 may comprise comparing the stored first service parameter information to the second service parameter information received with the second login request at step 240. Such comparison may, for example, be performed to determine whether the first login-management data structure can also be used to manage the second login.

Many non-limiting examples of service parameter information were provided above. Step 250 may comprise comparing any portion or all of such information. Step 250 may, for example, comprise comparing complete sets of service parameter information. In an example scenario, step 250 may comprise performing a bitwise compare between two sets of service parameter information. Step 250 may alternatively comprise comparing particular elements of the service parameter information that are deemed to be the most important service parameters, for example the most important when determining whether a login-management data structure can be shared between remote systems. In the context of the example network interface system 100 illustrated in FIG. 1, step 250 may comprise comparing service parameter information stored in a first RPI in Context Memory 160 to a second login request received via the Network I/O module 130.

Though the above discussion of step 250 focused on the comparison of service parameter information, any of a variety of types of information related to login management may be compared.

In general, step 250 comprises comparing second service parameter information corresponding to the second login to first service parameter information corresponding to the first login. Accordingly, the scope of various aspects of the disclosure should not be limited by characteristics of any particular type of information and/or any particular manner of making the comparison unless explicitly stated.

The method 200 may, at step 260, direct execution flow of the method 200 according to the results of the comparison made at step 250. For example, based at least in part on the comparing performed at step 250, if it is determined at step 260 that the compared information is identical (or close enough), then execution of the method 200 flows to step 290. For example, in such a scenario, the method 200 may determine that a same login-management data structure may be utilized (e.g., by an interface circuit) for managing both the first and second logins.

Also for example, if it is determined, based at least in part on the comparing performed at step 250 that the compared information is different (or different enough), then step 260 may direct execution of the method 200 to step 270. For example, in such a scenario, the method 200 may determine that different respective login-management data structures are appropriately utilized (e.g., by an interface circuit) for managing the first and second logins.

As with step 250, step 260 may be performed by a host driver executing on the host system. Alternatively, depending on the implementation, step 250 and/or step 260 may be performed by an interface system. Additionally for example, steps 250 and 260 may be performed by both the host and the interface system operating together. In an example implementation, a host may make the step 260 determination, and an interface system (e.g., coupled to the host) may also make the step 260 determination by, at least in part, receiving a message from the host telling the interface system of the determination results.

The method 200 may, at step 270, comprise storing information in a second data structure (e.g., a second login-management data structure) of a network interface chip (or IC) or adapter card. The data structure may, for example, have as a primary purpose the storage of information utilized to manage a login to the host system (e.g., a mass storage target system). Step 270 may, for example, share any or all aspects of step 220 discussed previously.

The information stored in the second data structure (e.g., a second login management data structure) may, for example, comprise service parameter information for the second login, many examples of which were provided above. The stored information may, for example, comprise any or all of the service parameter information presented previously and/or generally analogous information related to other communication protocols. For example, the stored information may comprise a set of all service parameter information for a given protocol, or a portion thereof (e.g., a set of relatively important parameters). Referring briefly back to FIG. 1, step 270 may comprise storing the information in RPI Memory 162 space in a Context Memory 160 (e.g., in a second RPI that is different from the first RPI in which information may have been stored at step 220).

In an example scenario, both a host system and an interface system coupled thereto may locally maintain the stored information (e.g., service parameter information). For example, a host system (e.g., a driver thereof) may utilize such service parameter information to make operational decisions. In such a scenario, the host system may, for example, access the stored information in a host memory or may alternatively access the stored information from the interface system. Also for example, an interface system (e.g., a network adapter card, a network interface chip, etc.) may utilize such information to communicate with a remote system via an intervening communication network.

Also, as discussed previously with regard to FIG. 1, information related to on-going active communications may also be stored in a data structure (e.g., a second active exchange data structure) of the network interface chip or adapter card. Such stored information may, for example, comprise communication state information for tracking the state of active I/O activity between the host and a second particular remote system. As an example, an XRI data structure may be allocated to a respective active I/O. Referring briefly back to FIG. 1, the active I/O information may be stored in XRI Memory 164 space in the Context Memory 160 (e.g., in a second XRI that is different from the first XRI in which active communications may be tracked related to the first login).

Further, as discussed previously with regard to FIG. 1, various additional operational information may be stored in Other Memory 166 space in the Context Memory 160.

Step 270 may, for example, be performed by an interface system in response to a message (e.g., a descriptor message) received from a host system. As explained above, step 250 and/or step 260 may be performed by a host driver. The message may, for example, direct the interface system to prepare a second login-management data structure for a second remote system. In an example scenario, the message from the host to the interface system may comprise the information (e.g., the second service parameter information) that is to be stored in the second login-management data structure. Referring briefly to FIG. 1, step 270 may be performed by the Interface Manager module 150 storing information in a second RPI data structure in the RPI Memory space 162 of the Context Memory 160 in response to a message received from the host via the Host I/O module 140.

In general, step 270 may comprise storing information in a second data structure (e.g., a second login-management data structure) of a network interface chip or adapter card. Accordingly, the scope of various aspects of the disclosure should not be limited by characteristics of any particular manner of storing or by characteristics of any particular type of information unless explicitly stated.

The method 200 may, at step 280, comprise managing the second login utilizing the data structure (e.g., a login management data structure). Step 280 may, for example, share any or all aspects of step 230 discussed previously, albeit with respect to a second remote system and a second login-management data structure.

As discussed previously, a login-management data structure (e.g., an RPI data structure) may comprise service parameter information that corresponds to a particular login. In such a scenario, step 280 may for example comprise analyzing the second service parameter information stored in the second login-management data structure to determine how to communicate with a second remote station via an intervening communication network. In an example scenario in which there is a one-to-one correspondence between a login-management data structure and a remote system, the second login-management data structure may comprise identification information corresponding to the remote system (e.g., a network address, port ID, node ID, device ID, system ID, etc., depending on the implementation).

In an example scenario, a host system may communicate a message (e.g., a descriptor) to the interface system comprising information that is to be communicated by the interface system in a message transmitted to a second remote system (e.g., to a second initiator system). The message from the host may, for example, comprise information identifying the login-management data structure (e.g., identifying an RPI) to be utilized by the interface system for the communication to the second remote system. In an example scenario in which there is a one-to-one mapping between login-management data structures and the remote system, the interface system may access the identified second login-management data structure to obtain all of the information needed to communicate the message to the second remote system. Many examples of service parameter information were provided previously. In such a scenario, the interface system may access device identification or network addressing information from the second login-management data structure.

In another example scenario, the message from the host to the interface system may comprise information identifying both the login-management data structure and the remote system (e.g., a network address, port ID, node ID, device ID, system ID, etc., depending on the implementation). In such a scenario, a single login-management data structure may be utilized by the interface system for communicating with a plurality of remote systems. For example, the service parameter information stored in a single login-management data structure may be utilized to manage logins for a plurality of remote systems or initiators.

Though the previous examples addressed managing communication of an outbound message from the host to a remote system, the principles also apply to receiving incoming messages from remote systems, which the interface system may then analyze and/or forward up to the host system. In an example scenario, a message may be received at the interface module from the second remote system (e.g., via a network I/O module), the message may then be analyzed for compliance with communication rules (e.g., by an interface manager module), and the message may be forwarded to the host system (e.g., via a host I/O module). The message may, for example, be communicated to the host system along with information identifying the login-management data structure and/or information identifying the second remote system.

In an example scenario where the communication protocol includes maintaining a concurrent sequence count between an initiator and a target (e.g., where a limit may be set), step 280 may comprise managing a concurrent sequence count between the initiator and the target. In such an example scenario, the network interface system 100 (e.g., an interface manager module thereof) may ensure that the limit is not being violated.

Referring briefly to FIG. 1, in an example implementation of step 280, the Interface Manager module 150 may operate to interact with the RPI Memory 162 space in the Context Memory 160 to utilize and/or manipulate information in an RPI data structure that corresponds to a particular login (e.g., for a particular initiator system). For example, the network interface system 100 may receive an outgoing message from a host via the Host I/O module 140, where the outgoing message comprises information from which an RPI data structure can be identified. The Interface Manager module 150 may then analyze the received message from the host to identify which RPI data structure to utilize and access service parameter information and/or addressing information stored in the identified RPI data structure to determine how to communicate the received message to the remote system. The Interface Manager module 150 may then utilize the Network I/O module 130 to transmit the received message to the remote system. As shown herein, in a scenario in which the received message from the host also includes remote source identification information, the Interface Manager module 150 may also use the remote source identification information to properly direct the outgoing message to the remote system.

As discussed previously, an active exchange data structure (e.g., an XRI data structure) may be maintained to manage the state of an on-going communication exchange. In the above scenario in which the interface system is communicating information with a second remote system, the interface system (e.g., the Interface Manager module 150 of FIG. 1) may analyze and/or manipulate the information stored in an active exchange data structure corresponding to the on-going communication exchange. In a scenario in which a new active exchange data structure is needed, the interface system may instantiate a new active exchange data structure (e.g., the Interface Manager module 150 may instantiate a new XRI data structure in the XRI Memory space 164 of the Context Memory 160).

In general, step 280 may comprise managing the second login utilizing the second data structure (e.g., a second login-management data structure, a login-management portion of a second data structure, etc.). Accordingly, the scope of various aspects of the disclosure should not be limited by characteristics of any particular manner of managing a login, any particular type of data structure, any manner of communicating, etc., unless explicitly stated.

The method 200 may, at step 290, comprise managing the second login by utilizing the first login-management data structure. In other words, steps 230 and 290 both comprise utilizing the same login-management data structure to manage the first login and the second login. Step 290 may, for example, share any or all characteristics with steps 230 and/or 280 discussed previously, albeit using the first login-management data structure to manage the second login.

As mentioned previously, a host system or a host driver executing on a host system may compare service parameter information associated with different logins to determine whether the service parameter information is the same, and thus whether a same login-management data structure may be utilized by an interface system for communicating with different logins. Such comparing and deciding may, for example, be performed at steps 250 and 260. In a scenario in which the host has determined that a pre-existing login-management data structure (e.g., an RPI) may be utilized for managing a new login, the host may communicate a message to the interface system notifying the interface system to also utilize the pre-existing login-management data structure to manage a new login. Referring briefly to FIG. 1, in an example scenario, the host may communicate a message to the Interface Manager module 150 via the Host I/O module 140 indicating to the Interface Manager module 150 that a first RPI that was set up to manage a first login is also to be used to manage a second login (and/or a third login, fourth login, etc.).

As discussed previously, a login-management data structure (e.g., an RPI data structure) may comprise service parameter information that corresponds to multiple logins. In such a scenario, step 290 may for example comprise analyzing the service parameter information stored in the login-management data structure to determine how to communicate with a remote station via an intervening communication network.

In an example scenario, a host system may communicate a message (e.g., a descriptor) to the interface system comprising information that is to be communicated by the interface system in a message transmitted to a remote system (e.g., to an initiator system). The message from the host may, for example, comprise information identifying the login-management data structure (e.g., identifying an RPI) to be utilized by the interface system for the communication to the remote system. The message from the host to the interface system may also comprise information identifying the remote system (e.g., a network address, port ID, node ID, device ID, system ID, etc., depending on the implementation) to which the message is ultimately destined. In such a scenario, a single login-management data structure may be utilized by the interface system for communicating with a plurality of remote systems. For example, the service parameter information stored in a single login-management data structure may be utilized to manage logins for a plurality of remote systems (or initiators or clients).

Though the previous example addressed managing communication of an outbound message from the host to a remote system, the principles also apply to receiving incoming messages from remote systems, which the interface system may then analyze and/or forward up to the host system. In an example scenario, a message may be received at the interface module from the remote system (e.g., via a network I/O module), the message may then be analyzed for compliance with communication rules (e.g., by an interface manager module), and the message may be forwarded to the host system (e.g., via a host I/O module). The message may, for example, be communicated to the host system along with information identifying the login-management data structure and information identifying the remote system.

In an example scenario where the communication protocol includes maintaining a concurrent sequence count between an initiator and a target (e.g., where a limit may be set), step 290 may comprise managing a concurrent sequence count between the initiator and the target. In such an example scenario, the network interface system 100 (e.g., an interface manager module thereof) may ensure that the limit is not being violated.

Referring briefly to FIG. 1, in an example implementation of step 290, the Interface Manager module 150 may operate to interact with the RPI Memory 162 space in the Context Memory 160 to utilize and/or manipulate information in an RPI data structure that corresponds to a particular login (e.g., for a particular initiator system). For example, the network interface system 100 may receive an outgoing message from a host via the Host I/O module 140, where the outgoing message comprises information from which an RPI data structure can be identified. The Interface Manager module 150 may then analyze the received message from the host to identify which RPI data structure to utilize and access service parameter information to determine how to communicate the received message to the remote system. The message from the host may also comprise information specifically identifying the remote system to which the message is ultimately destined. The Interface Manager module 150 may utilize such identification information to address the message transmitted to the remote system. The Interface Manager module 150 may then utilize the Network I/O module 130 to transmit the received message to the remote system.

As discussed previously, an active exchange data structure (e.g., an XRI data structure) may be maintained to manage the state of an on-going communication exchange. In the above scenario in which the interface system is communicating information with a remote system, the interface system (e.g., the Interface Manager module 150 of FIG. 1) may analyze and/or manipulate the information stored in an active exchange data structure corresponding to the on-going communication exchange. In a scenario in which a new active exchange data structure is needed, the interface system may instantiate a new active exchange data structure (e.g., the Interface Manager module 150 may instantiate a new XRI data structure in the XRI Memory space 164 of the Context Memory 160).

In general, step 290 may comprise managing the second login utilizing the first data structure (e.g., a first login-management data structure, a login-management portion of a first data structure, etc.). Accordingly, the scope of various aspects of the disclosure should not be limited by characteristics of any particular manner of managing a login, any particular type of data structure, any manner of communicating, any particular manner of sharing a login-management data structure between a plurality of logins, etc., unless explicitly stated.

The method may, at step 295, comprise performing continued operations. Such continued operations may comprise any of a number of characteristics. For example, step 295 may comprise looping execution flow of the method 200 back to any previous step. Also for example, step 295 may comprise continuing to establish and manage additional logins. Further for example, step 295 may comprise communicating between a host system and an interface system regarding the further sharing of login-management data structures between multiple logins. Additionally for example, step 295 may comprise directing execution flow to any other method step discussed herein, for example with regard to the methods 300 and 400 shown in FIGS. 3 and 4 and discussed below, the methods 800 and 900 shown in FIGS. 8 and 9 and discussed below, etc. In general, step 295 may comprise performing continued operations. Accordingly, the scope of various aspects of the present disclosure should not be limited by any particular continued operations unless explicitly stated.

Figure 3:
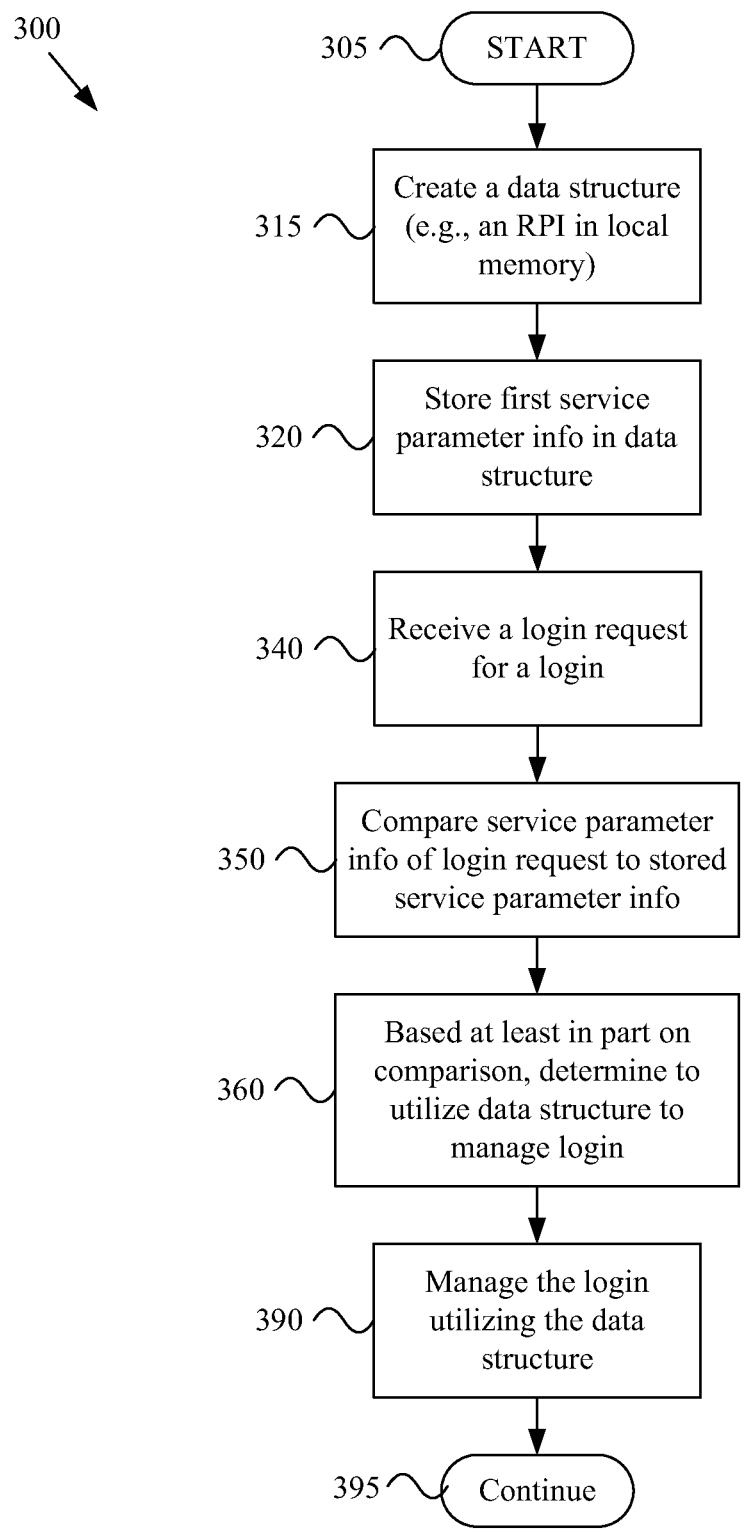
FIG. 3 shows a flow diagram showing an example method for managing system logins, in accordance with various aspects of the present disclosure.

Turning now to FIG. 3, such figure is a flow diagram showing an example method 300 for managing system logins, in accordance with various aspects of the present disclosure. The method 300 may share any or all characteristics with the method 200 illustrated in FIG. 2 and discussed previously. The method 300, or any portion thereof, may for example be implemented by the network interface system 100 illustrated in FIG. 1 and discussed previously. The steps of the method 300 may, for example, be performed at least in part by any or all of the modules of the network interface system 100.

The method 300 may begin executing at step 305. The method 300 may begin executing in response to any of a variety of causes or conditions. For example, the method 300 may begin executing in response to an indication that a message is arriving or has arrived. Such a message may, for example, arrive from a communication network and/or from a host.

The method 300 may, at step 315, comprise creating (or generating) a data structure in local memory of a network interface chip to, at least in part, manage one or more logins. Step 315 may, for example, share any or all characteristics with step 220 of the method 200 illustrated in FIG. 2 and discussed previously. For example, step 315 may share any or all characteristics with step 220 associated with the creation of a login-management data structure.

The method 300 may, at step 320, comprise storing information comprising service parameter information in the data structure, for example the data structure created at step 315. Step 320 may, for example, share any or all characteristics with step 220 of the method 200 illustrated in FIG. 2 and discussed previously. Step 320 may, for example, share any or all characteristics with step 220 associated with storing service parameter information and/or other information that may be utilized for login management. For example, step 320 may comprise storing service parameter information corresponding to a first login in a first login-management data structure (e.g., in an RPI data structure) in memory (e.g., in local context memory of an interface chip).

The method 300 may, at step 340, comprise receiving a login request for a login comprising service parameter information. Step 340 may, for example, share any or all characteristics with step 240 of the method 200 illustrated in FIG. 2 and discussed previously. Step 340 may also, for example, share any or all characteristics with step 210 of the method 200 illustrated in FIG. 2 and discussed previously. For example step 340 may comprise receiving a login request comprising second service parameter information that is different from or that matches the first service parameter information stored at step 320 (e.g., in whole or in part).

The method 300 may, at step 350, comprise comparing the service parameter information of the login request (e.g., received at step 340) to the service parameter information stored in the data structure (e.g., stored at step 320). Step 350 may, for example, share any or all characteristics with step 250 of the method 200 illustrated in FIG. 2 and discussed previously. For example, step 350 may comprise comparing a complete set (or partial set) of service parameter information from a login request to service parameter information associated with another login.

The method 300 may, at step 360, comprise, based at least in part on the comparing performed at step 350, determining to utilize the data structure (e.g., created and populated at steps 315 and 320) to manage the login (e.g., requested at step 340). Step 360 may, for example, share any or all characteristics with step 260 of the method illustrated in FIG. 2 and discussed previously. For example, step 360 may comprise a host (or host driver) performing the comparison of step 350 and determining that the data structure previously formed and populated at steps 315 and 320 (e.g., a login-management data structure created for managing another login) has the same or substantially the same service parameter information as that contained in the login request received at step 340, and because of this, the data structure can also be used for the login requested at step 340 in addition to one or more other logins.

The method 300 may, at step 390, comprise managing the login (e.g., requested at step 340), for example with an interface chip, using at least the data structure. Step 390 may, for example, share any or all characteristics with step 290 of the method 200 illustrated in FIG. 2 and discussed previously. Step 390 may also, for example, share any or all characteristics with step 230 of the method 200 illustrated in FIG. 2 and discussed previously. For example, step 390 may comprise managing the requested login and at least an earlier login utilizing a login-management data structure that was originally formed to manage the earlier login.

The method may, at step 395, comprise performing continued operations. Step 395 may, for example, share any or all characteristics with step 295 of the method illustrated in FIG. 2 and discussed previously. Such continued operations may comprise any of a number of characteristics. For example, step 395 may comprise looping execution flow of the method 300 back to any previous step. Also for example, step 395 may comprise continuing to establish and manage additional logins. Further for example, step 395 may comprise communicating between a host system and an interface system regarding the further sharing of login-management data structures between multiple logins. Additionally for example, step 395 may comprise directing execution flow to any other method step discussed herein, for example with regard to the methods 200 and 400 shown in FIGS. 2 and 4 and discussed above and below, any other method and/or method step discussed herein, etc. In general, step 395 may comprise performing continued operations. Accordingly, the scope of various aspects of the present disclosure should not be limited by any particular continued operations unless explicitly stated.

Figure 4:
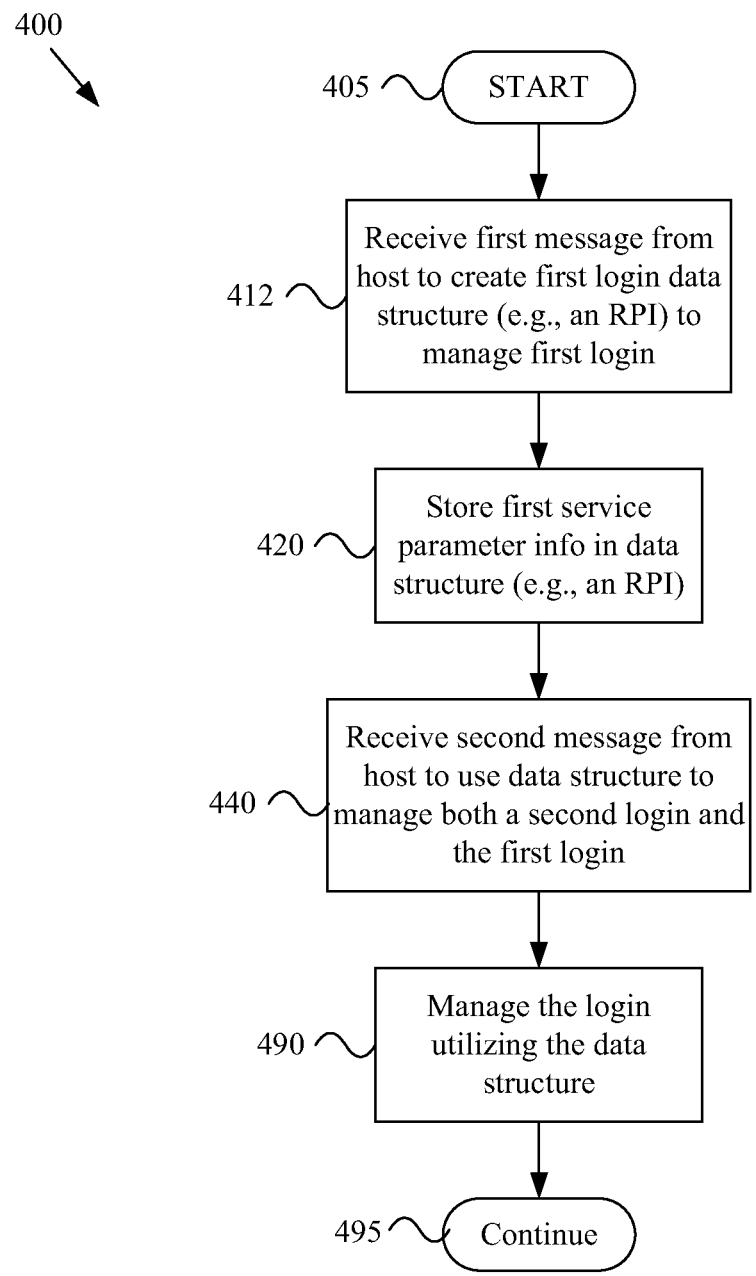
FIG. 4 shows a flow diagram showing an example method for managing system logins, in accordance with various aspects of the present disclosure.

Turning now to FIG. 4, such figure is a flow diagram showing an example method 400 for managing system logins, in accordance with various aspects of the present disclosure. The method 400 may share any or all characteristics with the methods 200 and 300 illustrated in FIGS. 2 and 3 and discussed previously. The method 400, or any portion thereof, may for example be implemented by the network interface system 100 illustrated in FIG. 1 and discussed previously. The steps of the method 400 may, for example, be performed at least in part by any or all of the modules of the network interface system 100.

The method 400 may begin executing at step 405. The method 400 may begin executing in response to any of a variety of causes or conditions. For example, the method 400 may begin executing in response to an indication that a message is arriving or has arrived. Such a message may, for example, arrive from a communication network and/or from a host.

The method 400 may, at step 412 comprise receiving a first message from a host indicating that the interface system or network interface system (e.g., an interface chip or board, for example a network interface chip or board) is to create (or generate) a data structure to manage a first login. Step 412 may, for example, share any or all aspects of step 220 of the method 200 shown in FIG. 2 and discussed previously. Step 412 may also, for example, share any or all aspects of steps 315 and 320 shown in FIG. 3 and discussed previously. For example, step 412 may share any or all aspects of steps 220, 315, and/or 320 related to receiving messages from a host directing the interface system to create a login-management data structure for managing a login.

Step 412 may, for example, comprise receiving a first message (e.g., a descriptor message) from a host system. The message may, for example, direct the recipient of the first message (e.g., an interface system) to prepare a first login-management data structure for a first remote system and/or to manage the login for the first remote system. In an example scenario, the message received from the host may comprise the information (e.g., service parameter information) that is to be stored in the first login-management data structure. Referring briefly to FIG. 1, step 412 may be performed by the Interface Manager module 150 receiving the first message from a host system via the Host I/O module 140.

In general, step 412 may comprise receiving a first message from a host indicating that the interface system or network interface system (e.g., an interface chip or board) is to create a data structure to manage a first login. Accordingly, the scope of various aspects of the present disclosure should not be limited by characteristics of any particular type of first message, of any particular type of host, of any particular manner of receiving such a first message, or of any particular type of data structure or manner of creating such a data structure, unless explicitly stated.

The method 400 may, at step 420, comprise storing information comprising login management information (e.g., service parameter information) for the first login in the data structure. Step 420 may, for example, share any or all characteristics with step 220 of the method 200 illustrated in FIG. 2 and discussed previously. Step 420 may also, for example, share any or all characteristics with step 320 of the method 300 illustrated in FIG. 3 and discussed previously.

Step 420 may, for example, comprise storing first login management information (e.g., first service parameter information) for managing the first login in a data structure (e.g., a login-management data structure, for example an RPI). Many examples of login management information, including service parameter information, were discussed previously. Step 420 may, for example, be performed in response to the message received at step 412.

In general, step 420 may comprise storing information in a data structure, for example storing login management information for managing a first login. Accordingly, the scope of various aspects of this disclosure should not be limited by characteristics of any particular data structure, manner of creating (or generating) and/or storing information in a data structure, particular types of information stored in the data structure, etc., unless explicitly stated.

The method 400 may, at step 440, comprise receiving a second message from the host indicating that the interface system (e.g., an interface chip or board, for example a network interface chip or board) is to use the data structure to manage both a second login and the first login. Step 440 may, for example, share any or all characteristics with steps 250 and 260 of the method 200 illustrated in FIG. 2 and discussed previously. Also for example, step 440 may share any or all characteristics with steps 350 and 360 of the method 300 illustrated in FIG. 3 and discussed previously.

For example, as mentioned previously, a host system may determine whether a same login-management data structure should be utilized by the interface system to manage multiple logins. In such a scenario, the interface system may receive a message (e.g., a descriptor) from the host system indicating that, for example, a first login-management data structure should be used to manage both a first login and a second login. Note that in accordance with various aspects of this disclosure, a single first login-management data structure may be utilized to manage a first arbitrary number of logins (e.g., 1, 2, 4, 8, 16, 32, 64, 128, 256, etc.), and a single second login-management data structure may be utilized to manage a second arbitrary number of logins (e.g., 1, 2, 4, 8, 16, 32, 64, 128, 256, etc.). In general, a number of logins managed may be or comprise any integer number, for example not necessarily a power of two.

Referring briefly to FIG. 1, in an example scenario, the Interface Manager module 150 may receive a message (e.g., a descriptor message) from a host via the Host I/O module 140, where the message indicates to the Interface Manager module 150 that a single RPI formed in RPI memory space 162 of the Context Memory 160 is to be used for managing multiple logins.

In general, step 440 may comprise receiving a second message from the host indicating that the interface system is to use the data structure to manage both a second login and the first login. Accordingly, the scope of various aspects of this disclosure should not be limited by characteristics of any particular type of message or any particular manner of communicating a message, unless explicitly stated.

The method 400 may, at step 490, comprise managing the login, for example with an interface chip, using at least the data structure created (or generated) and/or populated at step 420 (e.g., for another login). Step 490 may, for example, share any or all characteristics with steps 290 and 230 of the method 200 illustrated in FIG. 2 and discussed previously and/or with step 390 of the method 300 illustrated in FIG. 3 and discussed previously. For example, step 490 may comprise managing a second login utilizing a login-management data structure that was originally formed to manage an earlier login.

The method may, at step 495, comprise performing continued operations. Step 495 may, for example, share any or all characteristics with step 295 of the method 200 illustrated in FIG. 2 and discussed previously and/or with step 395 of the method 300 illustrated in FIG. 3 and discussed previously. Such continued operations may comprise any of a number of characteristics. For example, step 495 may comprise looping execution flow of the method 400 back to any previous step. Also for example, step 495 may comprise continuing to establish and manage additional logins. Further for example, step 495 may comprise communicating between a host system and an interface system regarding the further sharing of login-management data structures between multiple logins. Additionally for example, step 495 may comprise directing execution flow to any other method step discussed herein, for example with regard to the methods 200 and 300 shown in FIGS. 2 and 3 and discussed previously, with regard to any other method and/or method step discussed herein, etc. In general, step 495 may comprise performing continued operations. Accordingly, the scope of various aspects of the present disclosure should not be limited by any particular continued operations unless explicitly stated.

Various aspects of this disclosure concern utilizing a login-management data structure being utilized to manage a plurality of logins, for example with such logins share common service parameter information. In an example scenario in which such sharing occurs, the sharing may at times be modified. For example, when a login is discontinued by the remote system and/or the host system, the login may be purged from either or both of the host and interface systems.

A login may be discontinued for any of a variety of reasons. For example, a remote system may logout. Also for example, the host system and/or interface system may monitor use of the host system and discontinue a login in response to inappropriate use. Additionally, for example, the host system and/or interface system may discontinue a login in response to a failed authentication following a link error.

For example, when a network link fails, the host may desire to re-authenticate the remote systems that were using the failed link. In such a scenario, the host may send a message to the interface system (e.g., an interface card, an interface chip, etc.) to suspend a set of logins associated with a particular login-management data structure until they (or the end nodes) can be re-authenticated. In a scenario in which multiple logins are being managed by the interface system using a single login-management data structure, the host may effectively deactivate communications associated with the login-management data structure, re-authenticate each of the multiple logins, remove from the multiple logins those logins that did not successfully re-authenticate, and then resume communication associated with logins that did successfully re-authenticate.

For example, following a link failure or some disruption in the communication path, the host system may send a message to the interface system to suspend general I/O communication for one or more particular RPIs. Note that in various embodiments the suspension of active IOs due to detection of a link failure may be performed automatically by the Network Interface System. The host may then utilize the interface system to communicate authentication messages with the remote systems associated with the suspended logins. During this process, the host may track the remote systems that successfully re-authenticated and/or the remote systems that failed to successfully re-authenticate. After the re-authentication process, the host may communicate a message to the interface system indicating which logins associated with a particular RPI are still valid. The interface system then performs any housekeeping that is necessary, depending on the implementation, to remove the non-authenticated logins from association with the RPI and/or to clean up other operational aspects associated with the non-authenticated logins (e.g., active I/O data structures, etc.). The host system may also send a message (either a separate message or combined with the previous message) to the interface system to resume communication with the remaining logins that are associated with the RPI.

Various aspects of this disclosure are presented in the context of a host storage system (e.g., a high-end storage array comprising a host system and one or more interface cards or integrated circuits). It should be noted that such aspects generally apply to any system that manages logins for a plurality of systems, in particular those systems that utilize an interface system (e.g., a network interface card, a network interface chip, etc.).

As noted earlier, conventional systems (e.g., data storage systems) may comprise various latency issues. Various aspects of this disclosure address one or more of such issues, providing an efficient system and/or method for operation. Various examples are addressed herein.

Figure 5:
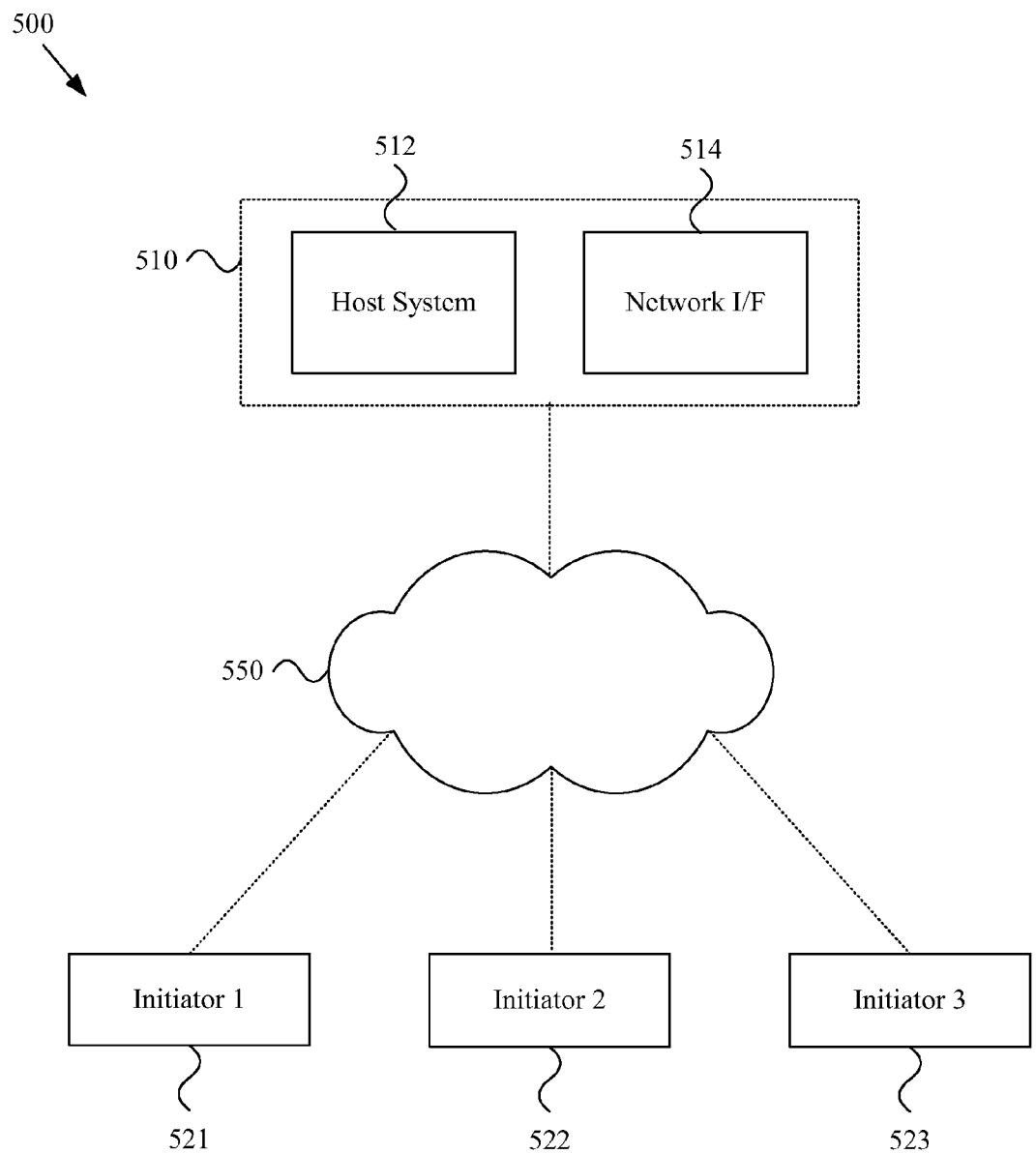
FIG. 5 is a diagram illustrating an example data storage network, in accordance with various aspects of the present disclosure.

Turning to FIG. 5, such figure shows a computing network environment 500, for example a data storage network environment, in which a computer system 510 comprising a Host system 512 and a Network Interface (I/F) system 514 is communicatively coupled to a plurality of Initiator systems 521, 522, 523 via a communication network 550. The computer system 510 may generally, for example, manage information transactions with other systems. The computer system 510 may comprise one or more processors, one or more storage devices, etc. The computer system 510 may, for example, comprise collocated or distributed components.

The computer system 510 may, for example, comprise a data storage (or mass storage) system that generally operates to store information. In such an implementation, the computer system 510 may, for example, manage reading and/or writing transactions for other systems that are communicatively coupled to the computer system 510. Non-limiting examples of such transactions are provided throughout this specification. For example, examples of reading and/or writing transactions are provided herein, for example in the discussions of FIGS. 6-9. The computer system 510 may, for example, comprise characteristics of an SCSI target (e.g., iSCI target or FC target), for example a device that performs SCSI transactions for an initiator. The computer system 510 may, for example, comprise aspects of a server, in a client/server model.

The Initiator systems 521, 522, and 523 may, for example, be systems that initiate transactions with the computer system 510. The Initiators 521, 522, and 523 may, for example, be systems that are remote from the computer system 510 and that wish to store information on and/or read information from the computer system 510. The Initiator systems 521, 522, and 523 may, for example, comprise characteristics of enterprise computing systems, personal computing systems, media communication systems, general data communication systems, telecommunication systems, etc. The Initiator systems 521, 522, and 523 may, for example, comprise characteristics of an SCSI or ISCI initiator (or FC initiator), for example a device that initiates an SCSI session. The Initiator systems 521, 522, and 523 may, for example, comprise aspects of a client, in a client/server model.

The communication network 550 may comprise characteristics of any of a variety of communication networks, some of which have already been provided herein. The communication network 550 may, for example, comprise characteristics of the Internet, local area networks, metropolitan area networks, wired and wireless networks, tethered and non-tethered optical networks, television and telephone networks, satellite networks, etc. The communication network 550 may, for example, operate in accordance with a wide range of communication protocols.

As mentioned above, the computer system 510 may comprise a Host system 512 and a Network I/F system 514. The Host 512 may, for example, utilize the Network I/F system 514 to communicate with remote systems (e.g., the Initiator systems 521, 522, and 523, peer systems, central controller systems, etc.) via one or more communication networks (e.g., the communication network 550).

The Network I/F system 514 may comprise characteristics of any of a variety of different types of network interface systems. For example, the Network I/F system 514 may comprise characteristics of a network interface card (e.g., inserted into a card slot of the Host system 512). Also for example, the Network I/F system 514 may comprise characteristics of a network interface IC (e.g., contained in a single integrated circuit package), where such an IC may be inserted into a socket of the Host system 512 (e.g., removably inserted and/or soldered into the socket). An example of a Network I/F system 514 (or circuit) is presented and discussed in relation to the network interface system 100 of FIG. 1. The Network I/F system 514 may, for example, share any or all characteristics with the network interface system 100 of FIG. 1.

As shown in the following examples, the Network I/F system 514 may operate to communicate with remote devices (e.g., the Initiators 521, 522, and 523) via the communication network 550 using one or more communication protocols (e.g., a Fibre Channel Protocol (FCP), iSCSI, etc.). Similarly, the Network I/F system 514 may also operate to communicate with the Host system 512 using one or more communication protocols, for example a handshaking protocol that defines the manner in which the Network I/F system 514 and the Host system 512 are to communicate. Such a handshaking protocol may, for example, be standard or proprietary to the manufacturer of the Host system 512 and/or Network I/F system 514.

The following discussion presents various aspects of the disclosure by way of example message exchange sequences. Such message exchange sequences may, for example, occur between the Initiators 521, 522, and 523, the Network I/F system 514, and the Host system 512.

Figure 6:
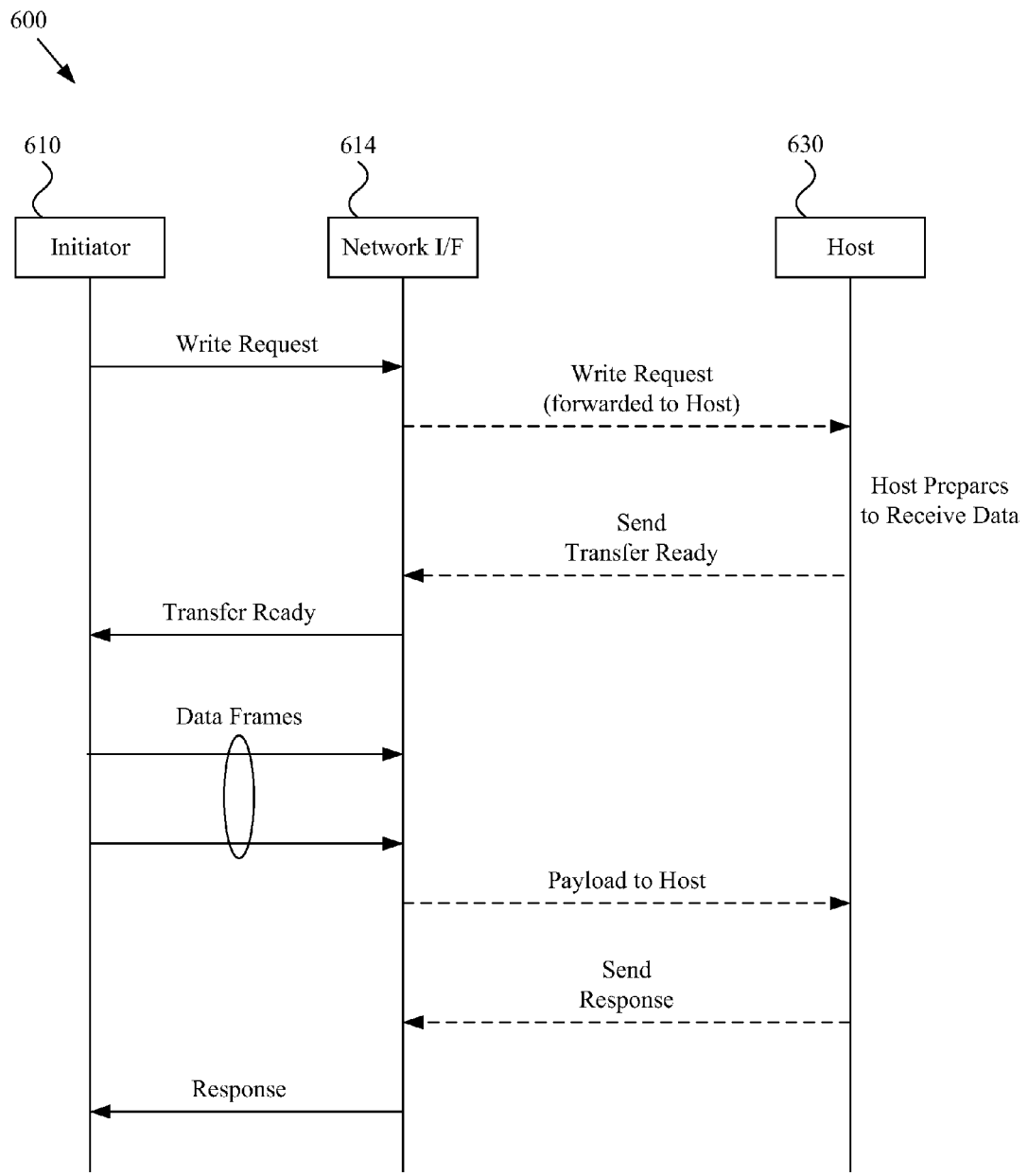
FIG. 6 is a diagram illustrating a first example message exchange sequence, in accordance with various aspects of the present disclosure.

Turning to FIG. 6, such figure shows a diagram illustrating a first example message exchange sequence 600, in accordance with various aspects of the present disclosure. The message exchange sequence 600 may, for example, provide an example of operating in a first mode (e.g., an "only" mode and/or one of a plurality of selectable modes). Although various aspects of the disclosure are presented in terms of a Small Computer System Interface (SCSI) write operation and Fibre Channel (FC) operation, the scope of various aspects of the disclosure should not be limited by characteristics of SCSI nor FC unless explicitly stated.

The example message exchange sequence 600 is shown occurring between three systems, including an Initiator system 610 (or Initiator 610), a Network Interface (I/F) system 614 (or Network I/F 614), and a Host system 630 (or Host 630). The Initiator 610 may, for example, share any or all characteristics with the Initiators 521, 522, and 523, illustrated in FIG. 5 and discussed previously, and/or any initiator (or client) or terminal discussed herein. The Network I/F system 614 may, for example, share any or all characteristics with the Network I/F system 514 illustrated in FIG. 5 and discussed previously, the network interface system 100 illustrated in FIG. 1 and discussed previously, and/or any network interface discussed herein. The Host 630 may, for example, share any or all characteristics with the Host system 512 and computer system 510 illustrated in FIG. 5 and discussed previously and/or any host discussed herein.

Following the example message sequence 600 illustrated in FIG. 6, the Initiator system 610 communicates a Write Request message to the Network I/F system 614. The Write Request message may, for example, be a request (or command) from the Initiator 610 for the Host 630 to store data that is sent by the Initiator system 610 to the Host 630. An example of such a Write Request message is a Small Computer System Interface (SCSI) Write Command (or an FCP Write command), which may for example be communicated from the Initiator 610 to the Network I/F system 614 (and ultimately to the Host 630) using the Fibre Channel Protocol (FCP), Transmission Control Protocol (TCP), etc. Any of a variety of transaction request messages may be substituted for the Write Request.

The Write Request may, for example, be communicated from the Initiator 610 to the Network I/F system 614 via any of a variety of communication networks or types thereof using any of a variety of communication protocols. Many example aspects of communication networks and/or protocols are discussed herein. Referring briefly to FIG. 1, the Network I/F system 614 (e.g., an Interface Manager module 150 thereof) may receive the Write Request via a Network I/O module 130 of the Network I/F system 614.

After receiving the Write Request, the Network I/F system 614 forwards the Write Request to the Host 630. The Network I/F system 614 may forward the received Write Request to the Host 630 in any of a variety of manners. For example, the Network I/F system 614 may forward the Write Request exactly as received. Also for example, the Network I/F system 614 may include the received Write Request as a payload in another message sent to the Host 630. Additionally for example, the Network I/F system 614 may populate a completely different type of message with particular items of information extracted from the received Write Request. Referring briefly to FIG. 1, the Network I/F system 614 (e.g., an Interface Manager module 150 thereof) may transmit the Write Request to the Host 630 via a Host I/O module 140 of the Network I/F system 614.

After receiving the Write Request, the Host 630 may prepare to receive the data from the Initiator 610 (e.g., data to be stored in accordance with the Write Request). Such preparation may, for example, comprise preparing buffers, configuring data integrity processing (e.g., T10 processing, for example based on the T10-PI protocol) based on information included in the Write Request, etc. As discussed herein, the Host 630 preparation at this point may introduce a substantial amount of latency to the requested transaction. For example, before the Initiator 610 may be cleared to send the data associated with a write request, the Host 630 may have to perform a substantial amount of processing.

When the Host 630 is prepared to receive the data from the Initiator 610, the Host 630 may communicate a Send Transfer Ready message to the Network I/F system 614. Such a message may, for example, trigger the Network I/F system 614 to send a Transfer Ready message to the Initiator 610. Referring briefly to FIG. 1, the Network I/F system 614 (e.g., an Interface Manager module 150 thereof) may receive the Send Transfer Ready message via a Host I/O module 140 of the Network I/F system 614. The Transfer Ready message may, for example, signify to the Initiator 610 that the Host 630 and/or the Network I/F system 614 are ready to receive its data.

In response to the Send Transfer Ready message received from the Host 630, the Network I/F system 614 communicates a Transfer Ready message to the Initiator 610, or generally a message indicating that the Host 630 is ready to receive the data to be stored. The Transfer Ready message may, for example, comprise an FCP XFR-RDY message, other ready-for-data message, etc. The Network I/F system 614 may, for example, communicate the Transfer Ready message to the Initiator 610 via the communication network (e.g., the communication network 550 of FIG. 5). Referring briefly to FIG. 1, the Network I/F system 614 (e.g., an Interface Manager module 150 thereof) may operate to transmit the Transfer Ready message to the Initiator 610 via a Network I/O module 130 of the Network I/F system 614.

In response to the "Transfer Ready" message received from the Network I/F system 614, the Initiator 610 may communicate one or more Data Frames to the Network I/F system 614, where the Data Frames contain the data to be written (or stored) by the Host 630. The Data Frames generally communicate the data to be stored (or written) to the Host 630 via the Network I/F system 614. The Data Frames may, for example, comprise FCP Data frames. Referring briefly to FIG. 1, the Network I/F system 614 (e.g., an Interface Manager module 150 thereof) may operate to receive the Data Frames from the Initiator 610 via a Network I/O module 130 of the Network I/F system 614.

The Network I/F system 614 aggregates (or coalesces) the data communicated in the Data Frames, for example identifying an exchange coinciding with an incoming frame and coalescing the incoming data with data already received for the exchange. When the aggregation (or collection) is completed, the Network I/F system 614 may communicate the aggregated (or coalesced) data (or payload) to the Host 630. Referring briefly to FIG. 1, the Network I/F system 614 (e.g., an Interface Manager module 150 thereof) may communicate the aggregated data to the Host 630 via a Host I/O module 140 of the Network I/F system 614. In an example scenario, the Network I/F system 614 may aggregate the received data in a local memory of the Network I/F system 614 until the aggregation is complete, and then send the aggregate (or payload) to the Host 630. In another example, the Network I/F system 614 may aggregate the received data in a buffer of the Host 630 until the aggregation is complete, and then send a message to the Host 630 indicating that the data to be written has been received, aggregated, and buffered in host memory. Referring briefly to FIG. 1, the Network I/F system 614 (e.g., an Interface Manager module 150 thereof) may communicate such a message to the Host 630 via a Host I/O module 140 of the Network I/F system 614.

After the Host 630 has received the data payload from the Network I/F system 614 (e.g., in a message, in a stream of messages, using direct memory access writes, etc.), the Host 630 may operate to communicate a Send Response message to the Network I/F system 614. The Send Response message may, for example, comprise a Send Status Request message. As with all messages discussed herein, for example communicated between the Host 630 and the Network I/F system 614, the Send Response message may comprise any of a variety of characteristics, for example depending on the protocol used for the communication between the Host 630 and the Network I/F system 614. Referring briefly to FIG. 1, the Network I/F system 614 (e.g., an Interface Manager module 150 thereof) may receive the Send Response message from the Host 630 via a Host I/O module 140 of the Network I/F system 614.

In response from the "Send Response" message received from the Host 630, the Network I/F system 614 communicates a Response message to the Initiator 610 (e.g., via the communication network 550). The Response message may, for example be an FCP Response Message. Referring briefly to FIG. 1, the Network I/F system 614 (e.g., an Interface Manager module 150 thereof) may communicate the Response message to the Initiator 610 via a Host I/O module 140 of the Network I/F system 614.

Though the above discussion included specific examples that included a write request, SCSI messages, FCP messages, etc., it should be noted that the scope of various aspects of this disclosure is not limited to such examples unless explicitly stated. For example, the scope of various aspects of this disclosure may apply to other types of transactions and other types of messaging corresponding to other communication protocols.

As mentioned above, the Host 630 preparation, if performed between the Host 630 receiving a Write Request message and the Host 630 sending a Transfer Ready message, may introduce a substantial amount of latency to the requested transaction. The message exchange sequence presented in FIG. 7 provides a manner of substantially reducing this latency.

Figure 7:
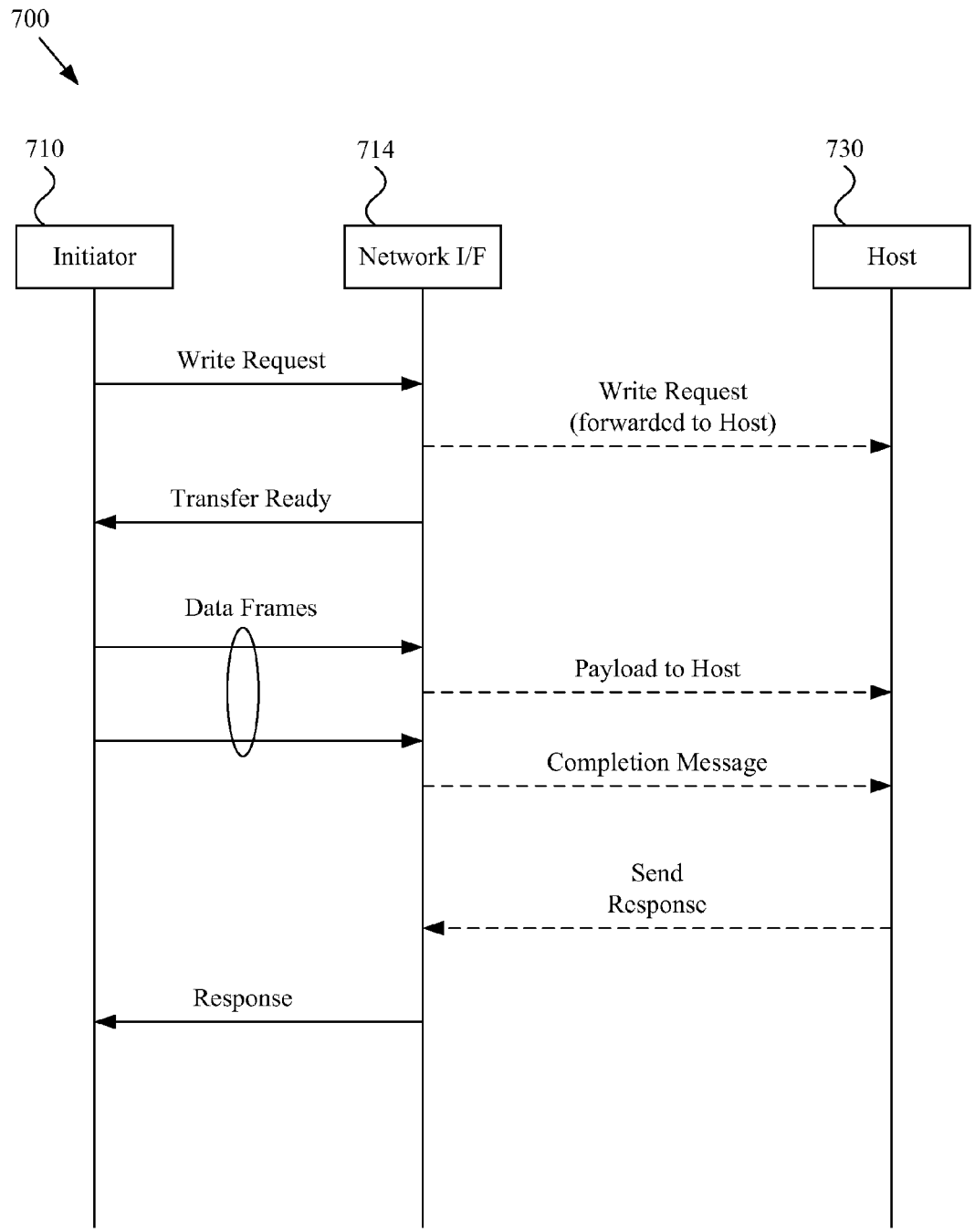
FIG. 7 is a diagram illustrating a second example message exchange sequence, in accordance with various aspects of the present disclosure.

FIG. 7 is a diagram illustrating a second example message exchange sequence 700, in accordance with various aspects of the present disclosure. The message exchange sequence 700 may, for example, provide an example of operating in a second mode (e.g., an "only" mode and/or one of a plurality of selectable modes). The example message exchange sequence 700 may, for example, share any or all characteristics with the sequence 600 illustrated in FIG. 6 and discussed previously. For example, the characteristics of the sequences 600 and 700 may be the same or may be combined.

Although various aspects of the disclosure are presented in terms of a Small Computer System Interface (SCSI) write operation and Fibre Channel (FC) operation, the scope of various aspects of the disclosure should not be limited by characteristics of SCSI nor FC unless explicitly stated.

The example message exchange sequence 700 is shown occurring between three systems, including an Initiator system 710 (or Initiator 710), a Network Interface (I/F) system 714 (or Network I/F 714), and a Host system 730 (or Host 730). The Initiator 710 may, for example, share any or all characteristics with the Initiators 521, 522, and 523, illustrated in FIG. 5 and discussed previously, with the Initiator 610 illustrated in FIG. 6 and discussed herein, and/or any terminal discussed herein. The Network I/F system 714 may share any or all characteristics with the Network I/F system 514 illustrated in FIG. 5 and discussed previously, the Network I/F system 614 illustrated in FIG. 6 and discussed previously, the network interface system 100 illustrated in FIG. 1 and discussed previously, and/or any network interface discussed herein. The Host 730 may, for example, share any or all characteristics with the Host 512 and/or computer system 510 illustrated in FIG. 5 and discussed previously, with the Host 630 illustrated in FIG. 6 and discussed previously, and/or any host discussed herein.

Following the example message sequence 700 illustrated in FIG. 7, the Initiator 710 communicates a Write Request message to the Network I/F system 714. The Write Request message may, for example, be a request (or command) from the Initiator 710 for the Host 730 to store data that is sent by the Initiator 710 to the Host 730. An example of such a Write Request message is a Small Computer System Interface (SCSI) Write Command (or an FCP Write command), which may for example be communicated from the Initiator 710 to the Network I/F system 714 (and ultimately to the Host 730) using the Fibre Channel Protocol (FCP), Transmission Control Protocol (TCP), etc.

The Write Request may, for example, be communicated from the Initiator 710 to the Network I/F system 714 via any of a variety of communication networks or types thereof using any of a variety of communication protocols. Referring briefly to FIG. 1, the Network I/F system 714 (e.g., an Interface Manager module 150 thereof) may receive the Write Request via a Network I/O module 130 of the Network I/F system 714. Many example aspects of communication networks and/or protocols are discussed herein.

After receiving the Write Request, the Network I/F system 714 forwards the Write Request to the Host 730. The Network I/F system 714 may forward the received Write Request to the Host 730 in any of a variety of manners. For example, the Network I/F system 714 may forward the Write Request exactly as received. Also for example, the Network I/F system 714 may include the received Write Request as a payload in another message sent to the Host 730. Additionally for example, the Network I/F system 714 may populate a completely different type of message with particular pieces of information extracted from the received Write Request.

As discussed with regard to the message exchange sequence of FIG. 6, after receiving the Write Request, the Host 730 may prepare to receive the data from the Initiator 710 (e.g., data to be stored in accordance with the Write Request). Such preparation may, for example, comprise preparing buffers, configuring security processing (e.g., T10 processing) based on information included in the Write Request, etc.

Alternatively for example, or in addition to making its own preparations, the Host 730 may have provided the Network I/F system 714 with information identifying buffer space, state machine space (e.g., XRI space), etc., so that the Network I/F system 714 has what it needs to receive the data associated with the Write Request before the Host 730 has indicated to the Network I/F system 714 that the Host 730 is ready to receive the data and/or without the Host 730 ever indicating to the Network I/F 730 that the Host 730 is ready to specifically receive the data associated with the Write Request. In other words, instead of waiting for the Host 730 to communicate a Send Transfer Ready message to the Network I/F system 714, or the like, before sending the Transfer Ready message to the Initiator 710, the Network I/F system 714 may automatically generate and send the Transfer Ready message immediately or when the Network I/F system 714 has verified that it is ready and/or that the Write Request meets particular criteria. For example, the Network I/F system 714 may have some of its own housekeeping to perform and/or may in various implementations need to verify (e.g., by analyzing identification and/or size information) that it is authorized by the Host 730 to operate in this manner for this particular Write Request. This operation is discussed in more detail herein.

Operating in the above manner may, for example always or in particular circumstances, allow the system to eliminate some or all of the latency associated with the Host 730 having to prepare to receive data associated with a requested transaction (e.g., a Write Request).

Note that in a scenario in which the Network I/F system 714 sends the Transfer Ready message to the Initiator 710 without waiting for the Host 730 to message the Network Interface system 714, the Network I/F system 714 may also send an indicator to the Host 730 that the Network I/F system 714 sent or is going to send such message. Alternatively, the Host 730 may already know this, for example based on configuration information for the Network I/F system 714 and/or based on information in the Write Request.

Without having to wait for a Send Transfer Ready message from the Host 730, the Network I/F system 714 may communicate a Transfer Ready message to the Initiator 710, or generally a message indicating that the Host 730 and/or Network I/F system 714 are ready to perform the transaction, in response to the Write Request (or general transaction request) received from the Initiator 710. The Transfer Ready message may, for example, comprise an FCP XFR-RDY message. The Network I/F system 714 may, for example, communicate the Transfer Ready message to the Initiator 710 via the communication network (e.g., the communication network 550 of FIG. 5). Referring briefly to FIG. 1, the Network I/F system 714 (e.g., an Interface Manager module 150 thereof) may transmit the Transfer Ready message to the Initiator 710 via a Network I/O module 130 of the Network I/F system 714.

In response to the Transfer Ready message received from the Network I/F system 714, the Initiator 710 may communicate one or more Data Frames to the Network I/F system 714, where the Data Frames contain the data to be written (or stored) by the Host 730. The Data Frames generally communicate the data to be stored (or written) to the Host 730 via the Network I/F system 714. The Data Frames may, for example, comprise FCP Data frames. Referring briefly to FIG. 1, the Network I/F system 714 (e.g., an Interface Manager module 150 thereof) may receive the Data Frames from the Initiator 710 via a Network I/O module 130 of the Network I/F system 714.

The Network I/F system 714 may aggregate (or coalesce) the data communicated in the Data Frames. The data aggregation may, for example, be performed in memory local to the Network I/F system 714 and/or may be performed in memory of the Host 730. When the aggregation (or collection) is performed in local memory of the Network I/F system 714, the Network I/F system 714 may communicate the aggregated data (or payload) to the Host 730. When the aggregation is performed in memory of the Host 730 (e.g., a receive buffer space previously defined by the Host 730 and communicated to the Network Interface system 714), for example by the Network I/F system 714 using direct memory access (DMA) to access the host memory, the Network I/F system 714 may aggregate the received data in a buffer of the Host 730 until the aggregation is complete, and then send a message to the Host 730 indicating that the data to be written has been received, aggregated, and buffered in host memory. Such a message may, for example, indicate to the Host 730 a memory address and/or size of the aggregated data. Referring briefly to FIG. 1, the Network I/F system 714 (e.g., an Interface Manager module 150 thereof) may transmit such a message to the Host 730 via a Host I/O module 140 of the Network I/F system 714.

After the Host 730 has received the data payload from the Network I/F system 714 (e.g., in a message, in a stream of messages, using direct memory access writes, etc.), the Host 730 may communicate a Send Response message to the Network I/F system 714. The Send Response message may, for example, comprise a Send Status Request message. As with all messages discussed herein, for example communicated between the Host 730 and the Network I/F system 714, the Send Response message may comprise any of a variety of characteristics, for example depending on the protocol used for the communication between the Host 730 and the Network I/F system 714. Referring briefly to FIG. 1, the Network I/F system 714 (e.g., an Interface Manager module 150 thereof) may receive the Send Response message from the Host 730 via a Host I/O module 140 of the Network I/F system 714.

In response from the "Send Response" message received from the Host 730, the Network I/F system 714 may communicate a Response message to the Initiator 710 (e.g., via the communication network 550). The Response message may, for example be an FCP Response Message. Referring briefly to FIG. 1, the Network I/F system 714 (e.g., an Interface Manager module 150 thereof) may transmit the Response message to the Initiator 710 via a Network I/O module 130 of the Network I/F system 714.

Though the above discussion included specific examples that included a write request, SCSI messages, FCP messages, etc., it should be noted that the scope of various aspects of this disclosure is not limited to such examples unless explicitly stated. For example, the scope of various aspects of this disclosure apply to other types of transactions and other types of messaging corresponding to other communication protocols.

Various aspects of this disclosure were presented and discussed with regard to any or all of the previous figures, for example and without limitation the system diagram 500 of FIG. 5 and the message flow diagrams 600 and 700 of FIGS. 6-7. Various aspects are presented in flow diagram form as example methods that may be performed in a host system and/or in a network interface.

Figure 8:
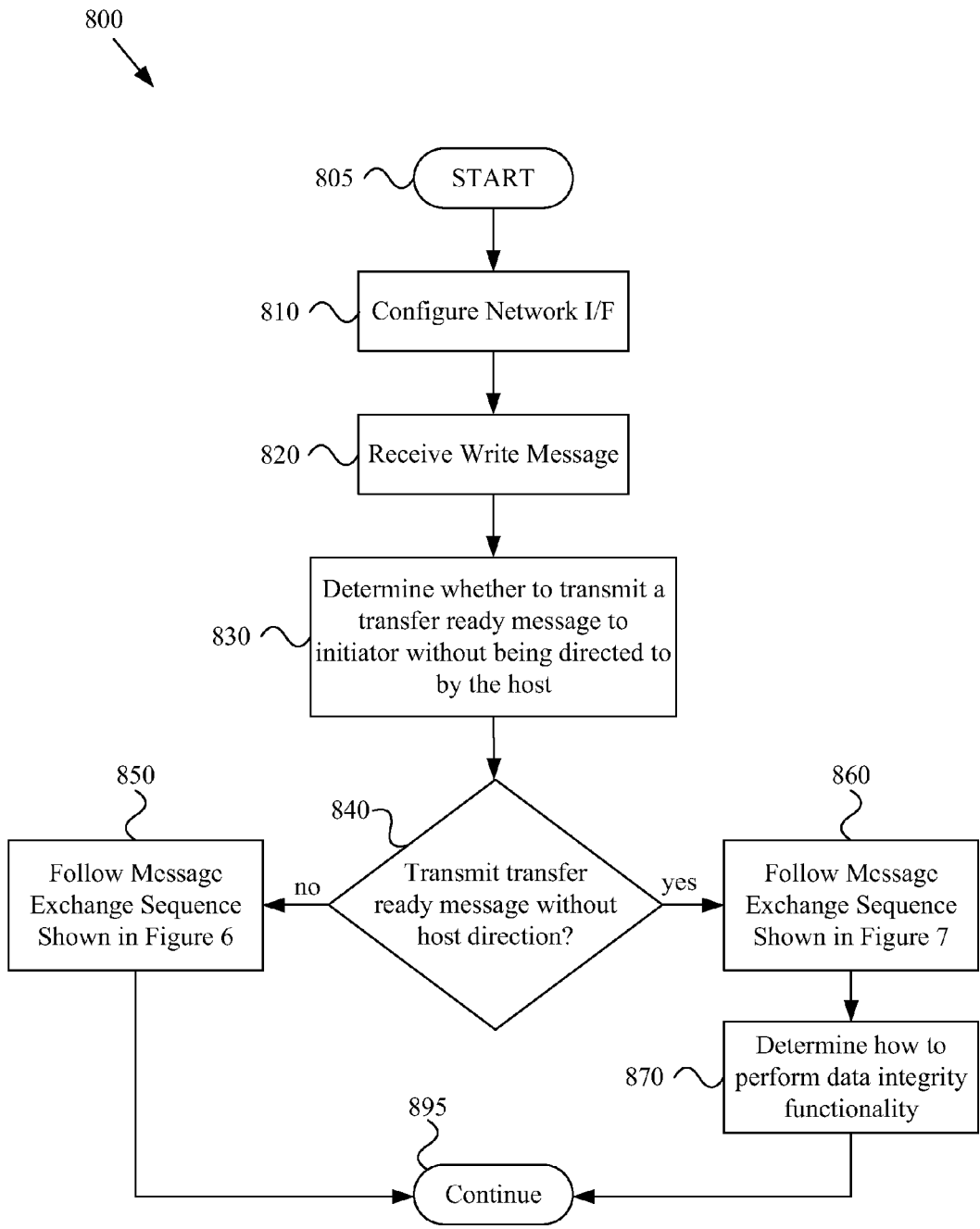
FIG. 8 shows a flow diagram showing an example method for interfacing a host storage system with an initiator, in accordance with various aspects of the present disclosure.

FIG. 8 shows a flow diagram showing an example method 800 for interfacing a host storage system with an initiator. The method 800 may, for example, be implemented in a network interface system, for example any or all of the network interface systems (or circuits) discussed herein. As a non-limiting example, any or all aspects of the method 800 may be performed in a network interface IC (e.g., in one or more die in a single integrated circuit package). For example, any or all aspects of the method 800 may be performed by a network interface processor executing software instructions stored in volatile and/or non-volatile memory of the network interface. For example, any or all aspects of the method 800 may be performed by the Network I/F system 514 of FIG. 5, the Network I/F system 614 of FIG. 6, the Network I/F system 714 of FIG. 7, and/or the network interface system 100 of FIG. 1, which were discussed previously.

The method 800 may begin executing at step 805. The method 800 may begin executing in response to any of a variety of causes or conditions. For example, the method 800 may begin executing in response to system or network interface initialization (e.g., during initial power-up, system reset, installation and/or configuration of the network interface chip or chart, etc.). Also for example, the method 800 may begin executing when a determination has been made (e.g., by a host system or by a network interface implementing the method 800) that a configuration of the network interface is desired.

Such a determination may, for example, be made in response to real-time operating conditions of the host system and/or network interface. Such operating conditions may, for example, comprise detecting a memory condition and determining that the detected memory condition warrants a reconfiguration of the network interface. For example, in a scenario in which the network interface is receiving and aggregating data in a memory space allocated by the host, the host and/or network interface monitors the amount of such memory space being utilized. In such a scenario, if too much of the allocated memory is being utilized, the host and/or network interface determines that a re-configuration of the network interface is warranted, for example allocating additional memory space, switching between operating modes (e.g., switching between respective modes corresponding generally with the message exchange sequences discussed previously), etc.

In another example scenario, a host bases a reconfiguration decision on whether a particular one or more lines are persistently reserved for particular devices (e.g., initiators). In such a scenario, a host may determine that only a memory exchange having characteristics of the exchange 600 illustrated in FIG. 6 is allowed, and determine to reconfigure the network interface to operate accordingly.

In still another example scenario, a host monitors latency time, and determines operating mode based on the monitored latency time. For example, the host determines to operate in a first mode (e.g., using an exchange sequence like that discussed with regard to FIG. 6) when monitored latency is below a particular level, and then determines to operate in a second mode (e.g., using an exchange sequence like that discussed with regard to FIG. 7) when monitored latency is above the particular level. In such a scenario, upon determining that an operating mode change is needed, the host may determine that the network interface system should be reconfigured.

In general, the method 800 may begin executing for any of a variety of causes or conditions. Accordingly, the scope of various aspects of the disclosure should not be limited by characteristics of any particular cause or condition unless explicitly stated. Referring briefly to FIG. 1, any or all of the functionality of step 805 may, for example, be performed by the Interface Manager Module 150, for example utilizing the Host I/O Module 140 and Memories 120 and 160.

The method 800 may, at step 810, comprise configuring the network interface system. Such configuring may comprise any of a variety of characteristics, non-limiting examples of which are presented herein. Step 810 may, for example, comprise a network interface system receiving configuration information from the host system, for example in a message received from the host, in a memory space of the host or network interface that is reserved for information and programmed by the host or network interface, etc. Such configuring may also, for example, receiving any of a variety of control signals apart from configuration data (e.g., including enable/disable signals, read/write signals, clock signals, feature enable/disable signals, interrupt signals, power signals, etc.).

Such configuration information may, for example, comprise general interface configuration information, like addressing information, register definitions, memory map information, protocol-defining information, timing information, communication network information, remote system identification information, security information, etc.

Such configuration information may also, for example, comprise information (e.g., data information and/or any signals) controlling a message exchange protocol utilized by the network interface system when communicating with the host (e.g., of a target system) and/or with remote systems (e.g., initiator systems). As explained previously, a network interface system may operate in accordance with a selectable message exchange sequence. Two examples of such sequences were presented, for example in the discussions of FIGS. 6 and 7, but the aspects discussed herein readily extend to three, four, five, or N integer number of selectable modes.

In an example scenario, the configuration information may indicate to the network interface system that it is to always operate in a particular mode corresponding to a particular message exchange system (e.g., until notified otherwise). For example, Step 810 may comprise a network interface system receiving a signal (e.g., a data signal, control signal, etc.) from the host indicating that the network interface system is to operate in a first mode corresponding to a particular message exchange sequence (e.g., the message exchange sequence 600 of FIG. 6). Also for example, step 810 may comprise a network interface system receiving a signal (e.g., a data signal, control signal, information stored in memory, etc.) from the host indicating that the network interface system is to operate in a second mode corresponding to a particular message exchange sequence (e.g., the message exchange sequence 700 of FIG. 7).

In another example scenario, the configuration information may comprise information indicating to the network interface system that it is to operate in a particular first mode in response to a first set of operating conditions (e.g., as identified by the network interface), in a particular second mode in response to a second set of operating conditions, in a particular third mode in response to a third set of operating conditions, etc. For example, step 810 may comprise a network interface system receiving information from the host indicating that the network interface system is to operate in a first mode (e.g., corresponding to the message exchange sequence 600 of FIG. 6) if a transaction request (e.g., a Write Request) is received for an amount of data greater than a particular threshold, and operate in a second mode (e.g., corresponding to the message exchange sequence 700 of FIG. 7 if the transaction request concerns an amount of data at or below the particular threshold.

In still another example, the configuration information may comprise information indicating to the network interface system that it is to operate in a particular first mode in response to a transaction request (e.g., a Write Request) from any of a first set of initiator systems, in a particular second mode in response to a transaction request from any of a second set of initiator systems, etc.

Though the above examples concerned data transaction size and/or system identity as criteria for determining the mode of operation, any of a variety of factors may be utilized to make the operating mode determination. Such factors may, for example, include security capability information, initiator prioritization information, information regarding latency, number of transactions that are presently active, percent utilization of the host system and/or a component thereof like a processor or memory, information regarding communication bandwidth being utilized, type of transaction being requested, etc. Also, a combination of one of more factors may be utilized to make the operating mode determination. For example, in an example scenario, the configuration may comprise information of both transaction size and initiator system identification that the network interface system is to utilize in making the mode determination (e.g., always operate in a first mode for a first set of initiator systems, always operate in a second mode for a second set of initiator systems, operate in either the first mode or second mode for a third set of initiator systems depending on transaction size, etc.).

The configuration information may also, for example, comprise default configuration information. For example, the network interface system may receive information from the host directing the network interface system to always operate in a first mode unless told otherwise. Note that such default operation may also be hard-programmed into the network interface system.

In general, step 810 comprises configuring the network interface system. Accordingly, the scope of various aspects of the disclosure should not be limited by characteristics of any particular manner of performing such configuring, of any particular type of configuration information, etc., unless explicitly stated. Referring briefly to FIG. 1, any or all of the functionality of step 810 may, for example, be performed by the Interface Manager Module 150, for example utilizing the Host I/O Module 140 and Memories 120 and 160.

The method 800 may, at step 820, comprise receiving a transaction request message (e.g., a Write Request message) from a source (e.g., an initiator). Many examples of such receiving are presented herein, for example with regard to the message exchange sequences 600 and 700 of FIGS. 6-7 and discussed previously. Step 820 may, for example, share any or all characteristics with such receiving. Referring briefly to FIG. 1, any or all of the functionality of step 820 may, for example, be performed by the Interface Manager Module 150, for example utilizing the Network I/O Module 130 and Memories 120 and 160.

The method 800 may, at step 830, comprise determining whether to transmit a response to the transaction request message received at step 820 to a source of the received message without being directed by the host to send such a response. For example, step 830 may comprise a network interface system determining whether to transmit a Transfer Ready message to an initiator in response to a Write Request received from the initiator before (or without) receiving a Send Transfer Request message (or descriptor) from the host. Step 830 may, for example, comprise determining whether to operate in a first mode in accordance with the message sequence 600 shown in FIG. 6 or in a second mode in accordance with the message exchange sequence 700 shown in FIG. 7.

Step 830 may comprise making the determination based on any one or more of a variety of criteria, various examples of which were provided above. For example, step 830 may comprise a network interface system making the determination based on configuration information received from the host. For example, step 830 may comprise making the determination based, at least in part, on transaction size (e.g., as indicated by the transaction request), transaction initiator identity. Also for example, step 830 may comprise making the determination based, at least in part, on security capability information, initiator prioritization information, information regarding latency, number of transactions that are presently active, percent utilization of the host system and/or a component thereof like a processor or memory, information regarding communication bandwidth being utilized, type of transaction being requested, etc.

In general, step 830 may comprise determining whether to transmit a response to the transaction request message received at step 820 to a source of the received message without being directed by the host to send such a response. Accordingly, the scope of various aspects of the disclosure should not be limited by characteristics of any particular manner of making the determination, unless explicitly stated. Referring briefly to FIG. 1, any or all of the functionality of step 830 may, for example, be performed by the Interface Manager Module 150, for example utilizing the Memories 120 and 160.

The method 800 may, at step 840, comprise directing execution flow of the method 800 in response to the determination made at step 830. If for example it is determined at step 830 that the network interface system should operate in a first mode (e.g., generally corresponding to the message exchange sequence 600 of FIG. 6), then step 840 may comprise directing execution flow of the method 800 to step 850. Also for example, if it is determined at step 830 that the network interface system should operate in a second mode (e.g., generally corresponding to the message exchange sequence 700 of FIG. 7), then step 840 may comprise directing execution flow of the method 800 to step 860.

Note that although step 840 shows only two flow branches, such number was chosen for illustrative clarity. It is contemplated that step 840 may direct execution flow of the method 800 into any number of branches, for example each branch corresponding to a different mode of operation (e.g., corresponding to a different message exchange sequence). Referring briefly to FIG. 1, any or all of the functionality of step 840 may, for example, be performed by the Interface Manager Module 150, for example utilizing the Memories 120 and 160.

The method 800 may, at step 850, comprise the network interface system operating in a first mode, for example generally corresponding to the message exchange sequence 600 shown in FIG. 6 and discussed previously. For example, step 850 may comprise the network interface system forwarding the transaction request received at step 820 to the host, and then waiting for a message from the host before responding to the source of the transaction request. For example, step 850 may comprise the network interface system forwarding a Write Request that was received from an initiator to the host, and then waiting for a Send Transfer Ready message from the host before sending a Transfer Ready message to the initiator. Referring briefly to FIG. 1, any or all of the functionality of step 850 may, for example, be performed by the Interface Manager Module 150, for example utilizing the Network I/O Module 130, the Host I/O Module 140 and Memories 120 and 160.

The method 800 may, at step 860, comprise the network interface system operating in a second mode, for example generally corresponding to the message exchange sequence 700 shown in FIG. 7 and discussed previously. For example, step 860 may comprise the network interface system forwarding the transaction request received at step 860 to the host, and then responding to the source of the transaction request without waiting for a message from the host directing the network interface to do so. For example, step 860 may comprise the network interface system forwarding a Write Request that was received from an initiator to the host, and sending a Transfer Ready message to the initiator without waiting for a Send Transfer Ready message (or descriptor) from the host. Referring briefly to FIG. 1, any or all of the functionality of step 860 may, for example, be performed by the Interface Manager Module 150, for example utilizing the Network I/O Module 130, the Host I/O Module 140 and Memories 120 and 160.

Though not shown in the messages exchange sequences illustrated in FIGS. 6-7, various aspects of this disclosure also concern performing various data integrity (or security) functionality. For example, a transaction request message (e.g., a Write Request) may comprise data integrity information used by the target system and the initiator system to verify data integrity. Such data integrity information may, for example, comprise information used in performing T10 PI processing or the like. T10 PI (Protection Information) is a feature that may, for example, be defined in the SBC-3 specification.

In a first scenario, for example when operating in accordance with the message exchange sequence 600 shown in FIG. 6, the host may process the Write Request (e.g., at the SCSI level or higher) to determine how to perform the T10-PI processing and then direct the network interface system how to perform the data integrity processing.

In a second scenario, for example when operating in accordance with the message exchange sequence 700 shown in FIG. 7, the network interface system may need to determine how to perform the data integrity processing. In such a scenario, the network interface system may, for example, analyze information included in the transaction request at a higher protocol stack layer than typically processed by the network interface system. For example, in a scenario involving SCSI communication, the network interface system may need to analyze T10-PI information contained in received messages, for example in a Write Request (or Write Command) message, to determine how to perform data integrity processing. The determination of how to perform the data integrity processing for the transaction may comprise many aspects, for example the type of processing to perform, the data integrity checks that need to be performed, the reference tag for the T10-PI, etc.

The above-discussed data integrity processing is shown generally at block 870 of FIG. 8. The steps may, however, be performed as part of step 860, after step 820, etc. Referring briefly to FIG. 1, any or all of the data integrity functionality discussed herein may, for example, be performed by the Interface Manager Module 150, for example utilizing the Memories 120 and 160.

The example method 800 may, at step 895, comprise performing continued processing. Such continued processing may comprise any of a variety of characteristics. For example, step 895 may comprise continued management of message exchange sequences. Also for example, step 895 may comprise looping execution flow back to any previous step of the method 800 or to any step of any of the other methods discussed herein.

Figure 9:
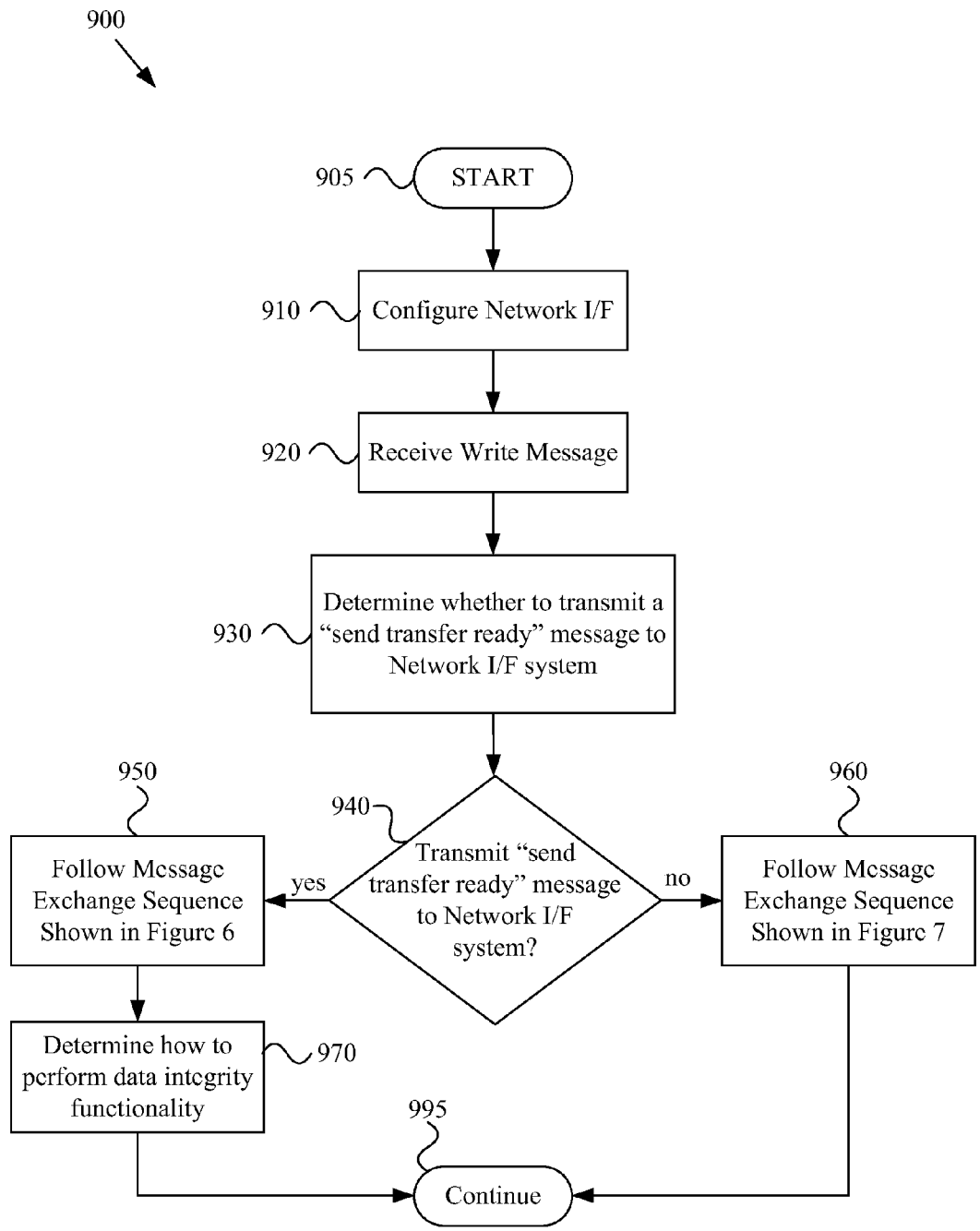
FIG. 9 shows a flow diagram showing an example method for interfacing a host storage system with an initiator, in accordance with various aspects of the present disclosure.
Figure 10:
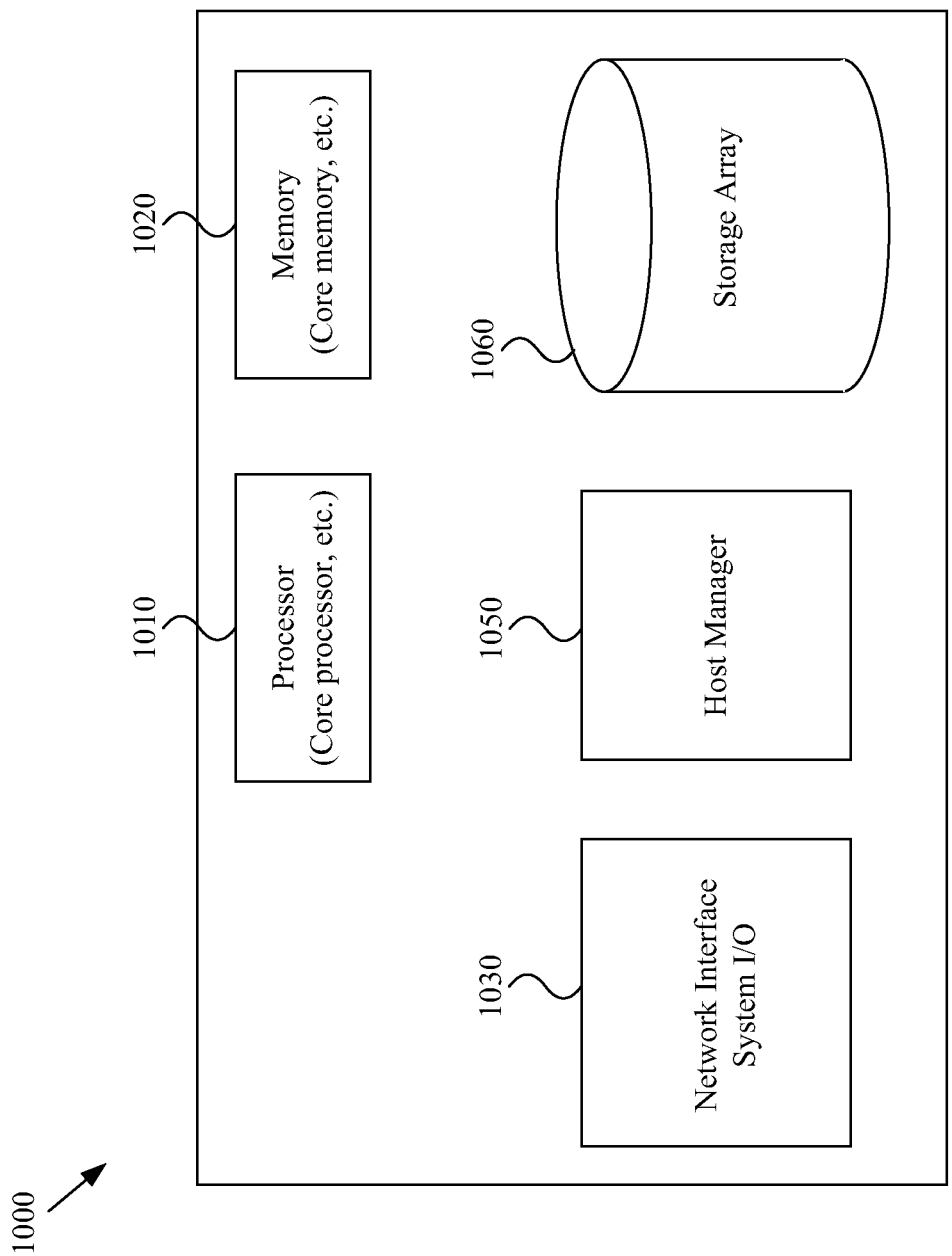
FIG. 10 is a diagram showing an example host system, in accordance with various aspects of the present disclosure.

FIG. 9 shows a flow diagram showing an example method 900 for interfacing a host storage system with an initiator. The method 900 may, for example, be implemented in a host system, for example any or all of the host systems (or circuits) discussed herein. As a non-limiting example, any or all aspects of the method 900 may be performed in one or more host ICs (e.g., in one or more die in a single integrated circuit package). For example, any or all aspects of the method 900 may be performed by a host processor executing software instructions stored in volatile and/or non-volatile memory of the host. Referring briefly ahead to FIG. 10, the interface functionality between a host system 1000 and a Network I/F system may be generally performed by a Network Interface System I/O module 1030, storage functionality may (for example) be generally performed by a Host Manager module 1050 in conjunction with a storage array 1060, and general processing functionality may be performed by a Processor 1010 (e.g., with a Memory 1020).

As shown in FIG. 9, the method 900 may begin executing at step 905. The method 900 may begin executing in response to any of a variety of causes or conditions. For example, the method 900 may begin executing in response to system or network interface initialization (e.g., during initial power-up, system reset, installation and/or configuration of the network interface chip or chart, etc.). Also for example, the method 900 may begin executing when a determination has been made (e.g., by a host system implementing the method 900 or by a network interface) that a configuration of the network interface is desired.

Such a determination may, for example, be made in response to real-time operating conditions of the host system and/or network interface. Such operating conditions may, for example, comprise detecting a memory condition and determining that the detected memory condition warrants a reconfiguration of the network interface. For example, in a scenario in which the network interface is receiving and aggregating data in a memory space allocated by the host, the host and/or network interface may monitor the amount of such memory space being utilized. In such a scenario, if too much of the allocated memory is being utilized, the host and/or network interface determines that a re-configuration of the network interface is warranted, for example allocating additional memory space, switching between operating modes (e.g., switching between respective modes corresponding generally with the message exchange sequences discussed previously), etc.

In another example scenario, a host bases a reconfiguration decision on whether a particular one or more lines are persistently reserved for particular devices (e.g., initiators). In such a scenario, a host may determine that only a memory exchange having characteristics of the exchange 600 illustrated in FIG. 6 is allowed, and the host determines to reconfigure the network interface to operate accordingly.

In still another example scenario, a host may monitor latency time, and determine operating mode based on the monitored latency time. For example, the host may determine to operate in a first mode (e.g., using an exchange sequence like that discussed with regard to FIG. 6) when monitored latency is below a particular level, and then determine to operate in a second mode (e.g., using an exchange sequence like that discussed with regard to FIG. 7) when monitored latency is above the particular level. In such a scenario, upon determining that an operating mode change is needed, the host may determine that the network interface should be reconfigured.

In general, the method 900 may begin executing for any of a variety of causes or conditions. Accordingly, the scope of various aspects of the disclosure should not be limited by characteristics of any particular cause or condition unless explicitly stated.

The method 900 may, at step 910, comprise configuring the network interface. Such configuring may comprise any of a variety of characteristics, non-limiting examples of are presented herein. Step 910 may, for example, comprise a host communicating configuration information to the network interface system (e.g., a network interface card, network interface chip, etc.), for example in a message transmitted to the network interface system, in a memory space of the host or network interface system that is reserved for information and programmed by the host or network interface system, etc. Such configuring may also, for example, comprise transmitting any of a variety of control signals apart from configuration data (e.g., including enable/disable signals, read/write signals, clock signals, feature enable/disable signals, interrupt signals, power signals, etc.).

Such configuration information may, for example, comprise general interface configuration information, like addressing information, register definitions, memory map information, protocol-defining information, timing information, communication network information, remote system identification information, security information, etc.

Such configuration information may also, for example, comprise information (e.g., data information and/or any signals) for controlling a message exchange protocol utilized by the network interface system when communicating with the host (e.g., of a target system) and/or with remote systems (e.g., initiator systems). As explained previously, a network interface system may operate in accordance with a selectable message exchange sequence. Two examples of such sequences are presented herein, for example in the discussions of FIGS. 6 and 7, but the aspects discussed herein readily extend to three, four, five, or N integer number selectable modes.

In an example scenario, the configuration information may indicate to the network interface system that it is to always operate in a particular mode corresponding to a particular message exchange system (e.g., until notified otherwise). For example, Step 910 may comprise a host communicating a signal (e.g., a data signal, control signal, etc.) to the network interface system indicating that the network interface system is to operate in a first mode corresponding to a particular message exchange sequence (e.g., the message exchange sequence 600 of FIG. 6). Also for example, step 910 may comprise a host communication a signal (e.g., a data signal, control signal, information stored in memory, etc.) to the network interface system indicating that the network interface system is to operate in a second mode corresponding to a particular message exchange sequence (e.g., the message exchange sequence 700 of FIG. 7).

In another example scenario, the configuration information may comprise information indicating to the network interface system that it is to operate in a particular first mode in response to a first set of operating conditions (e.g., as identified by the network interface), in a particular second mode in response to a second set of operating conditions, in a particular third mode in response to a third set of operating conditions, etc. For example, step 910 may comprise a host communication information to the network interface system indicating that the network interface system is to operate in a first mode (e.g., corresponding to the message exchange sequence 600 of FIG. 6) if a transaction request (e.g., a Write Request) is received for an amount of data greater than a particular threshold, and operate in a second mode (e.g., corresponding to the message exchange sequence 700 of FIG. 7 if the transaction request concerns an amount of data at or below the particular threshold.

In another example scenario, the configuration information may comprise information indicating to the network interface system that it is to operate in a particular first mode in response to a transaction request (e.g., a Write Request) from any of a first set of initiator systems, in a particular second mode in response to a transaction request from any of a second set of initiator systems, etc.

Although the above examples concerned data transaction size and/or system identity as criteria for determining the mode of operation, any of a variety of factors may be utilized to make the operating mode determination. Such factors may, for example, include security capability information, initiator prioritization information, information regarding latency, number of transactions that are presently active, percent utilization of the host system and/or a component thereof like a processor or memory, information regarding communication bandwidth being utilized, type of transaction being requested, etc. Also, a combination of one or more factors may be utilized to make the operating mode determination. For example, in an example scenario, the configuration may comprise information of both transaction size and initiator system identification that the network interface system is to utilize in making the mode determination (e.g., always operate in a first mode for a first set of initiator systems, always operate in a second mode for a second set of initiator systems, and/or operate in either the first mode or second mode for a third set of initiator systems depending on transaction size, etc.).

The configuration information may also, for example, comprise default configuration information. For example, the network interface system may receive information from the host directing the network interface system to always operate in a first mode unless told otherwise. Note that such default operation may also be hard-programmed into the network interface system.

In general, step 910 comprises configuring the network interface system. Accordingly, the scope of various aspects of the disclosure should not be limited by characteristics of any particular manner of performing such configuring, of any particular type of configuration information, etc., unless explicitly stated.

The method 900 may, at step 920, comprise receiving a transaction request message (e.g., a Write Request message) from the network interface system (e.g., received by the network interface system from an initiator and forwarded to the host). Many examples of such receiving are presented herein, for example with regard to the message exchange sequences 600 and 700 of FIGS. 6-7 and discussed previously. Step 920 may, for example, share any or all characteristics with such receiving.

The method 900 may, at step 930, comprise determining whether to transmit a response to the transaction request message received at step 920 to the network interface system, for example to direct the network interface system how to respond to the transaction request received by the network interface system. For example, step 930 may comprise a host determining whether the network interface system is configured to transmit a Transfer Ready message to an initiator in response to a Write Request received from the initiator before (or without) receiving a Send Transfer Request message (or descriptor) from the host. Step 930 may, for example, comprise determining whether the network interface system is configured to operate in a first mode in accordance with the message sequence 600 shown in FIG. 6 or in a second mode in accordance with the message exchange sequence 700 shown in FIG. 7.

Step 930 may comprise making the determination based on any one or more of a variety of criteria, various examples of which are provided above. For example, step 930 may comprise the host making such determination based on information received from the network interface system (e.g., with the forwarded transaction request message or in a separate message) indicating in what mode the network interface system is operating.

Many examples of such determining were provided with regard to step 830 of the method shown in FIG. 8. Any or all of such examples may be performed by the host, either autonomously or in conjunction with the network interface system.

For example, step 930 may comprise a host making the determination based on configuration information sent to the network interface system. For example, step 930 may comprise making the determination based, at least in part, on transaction size (e.g., as indicated by the transaction request) and/or transaction initiator identity. Also for example, step 930 may comprise making the determination based, at least in part, on security capability information, initiator prioritization information, information regarding latency, number of transactions that are presently active, percent utilization of the host system and/or a component thereof like a processor or memory, information regarding communication bandwidth being utilized, type of transaction being requested, etc.

In general, step 930 may comprise determining whether to transmit a response to the transaction request message received at step 920 to the network interface system. Accordingly, the scope of various aspects of the disclosure should not be limited by characteristics of any particular manner of making the determination, unless explicitly stated.

The method 900 may, at step 940, comprise directing execution flow of the method 900 in response to the determination made at step 930. If for example it is determined at step 930 that the host and/or network interface system should operate in a first mode (e.g., generally corresponding to the message exchange sequence 600 of FIG. 6), then step 940 may comprise directing execution flow of the method 900 to step 950. Also for example, if it is determined at step 930 that the host and/or network interface system should operate in a second mode (e.g., generally corresponding to the message exchange sequence 700 of FIG. 7), then step 940 may comprise directing execution flow of the method 900 to step 960.

Note that though step 940 shows only two flow branches, such number was chosen for illustrative clarity. It is contemplated that step 940 may direct execution flow of the method 900 into any number of branches, for example each branch corresponding to a different mode of operation (e.g., corresponding to a different message exchange sequence).

The method 900 may, at step 950, comprise the host operating in a first mode, for example generally corresponding to the message exchange sequence 600 shown in FIG. 6 and discussed previously. For example, step 950 may comprise the host receiving the transaction request from the network interface system at step 920, and then responding to the received transaction request, for example by sending a message to the network interface system directing the network interface system to send a transaction ready message to the initiator of the transaction request. For example, step 950 may comprise the host responding to a Write Request forwarded to the host from the network interface system by transmitting a Send Transfer Ready Request message (or descriptor) to the network interface system.

The method 900 may, at step 960, comprise the host operating in a second mode, for example generally corresponding to the message exchange sequence 700 shown in FIG. 7 and discussed previously. For example, step 960 may comprise the host receiving the transaction request from the network interface system at step 920, and then refraining from responding to the received transaction request, for example having determined that the network interface system is proceeding with the transaction without need for such a message from the host. For example, step 960 may comprise the host receiving a forwarded Write Request from the network interface system, and refraining from sending a Send Transfer Ready Request message (or descriptor) to the network interface system.

As discussed previously in relation to FIG. 8, although not shown in the messages exchange sequences illustrated in FIGS. 6-7, various aspects of this disclosure also concern performing various data integrity (or security) functionalities. For example, a transaction request message (e.g., a Write Request) may comprise data integrity information used by the target system and the initiator system to verify data integrity. Such data integrity information may, for example, comprise information used in performing T10-PI processing.

In a first scenario, for example when operating in accordance with the message exchange sequence 600 shown in FIG. 6, the host may process the Write Request (e.g., at the SCSI level or higher) to determine how to perform the T10-PI processing and then direct the network interface system how to perform the data integrity processing. For example, in a scenario involving SCSI (or iSCSI) communication, the host may need to analyze T10-PI information contained in received messages, for example in a Write Request (or Write Command) message, to determine how to perform data integrity processing. The determination of how to perform the data integrity processing for the transaction may comprise many aspects, for example the type of processing to perform, the data integrity checks that need to be performed, the reference tag for the T10-PI, etc. Having determined how to perform the data integrity processing, the host may then communicate the results of this determination to the network interface system, for example as part of a Send Transfer Ready Request message, as part of a different message, etc.

In a second scenario, for example when operating in accordance with the message exchange sequence 700 shown in FIG. 7, the network interface system may need to determine how to perform the data integrity processing, for example rather than having the host make such determination and then directing the network interface how to perform. Such processing is discussed herein, for example in the discussion of FIG. 8. In such a scenario, the host may refrain from making the determination and leave such determination to the network interface system. Also, the host may make the determination for its own use.

The example method 900 may, at step 995, comprise performing continued processing. Such continued processing may comprise any of a variety of characteristics. For example, step 995 may comprise continued management of message exchange sequences. Also for example, step 995 may comprise looping execution flow back to any previous step of the method 900 or to any step of any of the other methods discussed herein.

The above-discussed data integrity processing and/or communicating with the network interface is shown generally at block 970 of FIG. 9. The steps may, however, be performed as part of step 950, after step 920, etc.

As mentioned above, one or more of the steps of the method 900 illustrated in FIG. 9 may be performed by a host system, for example any of the host systems discussed herein. An example illustration of a host system is shown in FIG. 10.

FIG. 10 is a diagram showing an example host system 1000, in accordance with various aspects of the present disclosure. The host system 1000 may share many of the characteristics of the network interface system 100 illustrated in FIG. 1 and discussed previously. The host system 1000 may, for example, share any or all characteristics with the Host system 512 shown in FIG. 5 and discussed previously. The host system 1000 may also, for example, share any or all characteristics with the Host system 630 shown in FIG. 6 and discussed previously, with the Host system 730 shown in FIG. 7 and discussed previously, etc. Additionally, the host system 1000 may perform any or all of the host-related activities discussed herein. Further, the host system 1000 or various modules thereof may share any or all characteristics with the network interface system 100 or various modules thereof illustrated in FIG. 1 and discussed previously.

The host system 1000 may comprise one or more Processors 1010 and one or more Memories 1020. Such Processor(s) 1010 and Memory(s) 1020 may, for example, operate to perform the functionality discussed with regard to functional modules of the host system 1000. The host system 1000 may also, for example in a mass storage implementation, comprise a storage array 1060. The host system 1000 may, for example, comprise a Host Manager module 1050 that operates to perform general functionality of the host system 1000.

The host system 1000 may further, for example, comprise a Network Interface System I/O module 1030, which may for example operate to communicate with one or more network interface systems (as discussed herein). For example, the host system 1000 (e.g., the Host Manager module 1050) may utilize the Network Interface System I/O module 1030 to communicate with the Network I/F system 514 of FIG. 5. Also for example, the host system 1000 (e.g., the Host Manager module 1050) may utilize the Network Interface System I/O module 1030 to communicate with the Network I/F system 714 of FIG. 7, with the Network I/F system 614 of FIG. 6, and/or with the network interface system 100 of FIG. 1. As discussed herein, such network interface systems may comprise a network interface card (or "NIC") coupled to the host system 1000 and/or a network interface chip coupled to the host system 1000. Note that the host system 1000 and a network interface system with which the host system 1000 communicates using the Network Interface System I/O module 1030 need not be co-located (e.g., they may be components of a geographically distributed system). Thus, the Network Interface System I/O module 1030 may communicate with the network interface system utilizing any of a variety of communication protocols and/or media, non-limiting examples of which are discussed herein.

With reference to the method 900 illustrated in FIG. 9, various functional aspects of the host system 1000 are presented herein by example. Steps 905, 910, and 920 of the method 900 may, for example, be implemented by the Host Manager module 1050 and/or Network I/F Interface module 1030. Also, steps 930 and 940 of the method 900 may, for example, be implemented by the Host Manager module 1050.

Additionally, steps 950 and 960 may, for example, be implemented by the Host Manager module 1050, the Network I/F Interface module 1030, and the Memory(s) 1020 and storage array 1060. Further step 970 may, for example, be implemented by the Host Manager module 1050.

As discussed above, any one or more of the modules and/or functions discussed herein may be implemented by a processor executing software instructions. Similarly, other embodiments may comprise or provide a non-transitory computer readable medium and/or storage medium, and/or a non-transitory machine readable medium and/or storage medium, having stored thereon, a machine code and/or a computer program having at least one code section executable by a machine and/or a computer (or processor), thereby causing the machine and/or computer to perform the processes as described herein.

In summary, various aspects of the present disclosure provide a system and method for efficiently managing multiple logins. Various aspects of the disclosure also provide a system and method for efficiently conducting data storage transactions. While the foregoing has been described with reference to certain aspects and embodiments, it will be understood by those skilled in the art that various changes may be made and equivalents may be substituted without departing from the scope of the disclosure. In addition, many modifications may be made to adapt a particular situation or material to the teachings of the disclosure without departing from its scope. Therefore, it is intended that the disclosure not be limited to the particular embodiment(s) disclosed, but that the disclosure will include all embodiments falling within the scope of the appended claims.

What is claimed is:

1. A method for interfacing a mass storage target system with a plurality of initiators, the method comprising:
    creating a data structure in local memory of a network interface chip to, at least in part, manage one or more logins;
    storing information comprising link service parameter information in the data structure, for maintaining initiator-target communications via a link;
    receiving a login request for a login comprising link service parameter information for maintaining initiator-target communications via a link;
    comparing the link service parameter information of the login request to the link service parameter information stored in the data structure;
    determining, based at least in part on said comparing, to utilize the data structure to manage the login; and
    managing the login with the network interface chip using at least the data structure.

2. The method of claim 1, wherein
    the link service parameter information is negotiated during a login interaction between an initiator and a target.

3. The method of claim 1, wherein
    managing the login comprises determining how to engage in communications via an intervening communication network.

4. The method of claim 1, comprising receiving configuration information from a host of the mass storage target system at the network interface chip that indicates to the network interface chip whether login control data structures can only be used in a one-to-one relationship with a respective initiator or whether login control data structures may be used in a one-to-many relationship with a plurality of initiators.

5. The method of claim 4, wherein said receiving configuration information occurs during initialization of the mass storage target system.

6. The method of claim 4, wherein said receiving configuration information occurs during post-initialization operation of the mass storage target system.

7. The method of claim 1, comprising receiving at the network interface chip a first message from a host of the mass storage target system, the first message for directing the network interface chip to transmit a second message to an initiator, the first message comprising information identifying the data structure and information identifying the initiator.

8. The method of claim 1, comprising transmitting a second message from the network interface chip to a host of the mass storage target system regarding a first message received by the network interface chip from an initiator, the second message comprising information identifying the data structure and information identifying the initiator.

9. The method of claim 1, wherein the link service parameter information stored in the data structure comprises an entire set of link service parameter information defined for a communication protocol.

10. A network interface for interfacing a mass storage target system with a plurality of initiators, the network interface comprising:
at least one module operable to, at least:
create a data structure in local memory of a network interface chip to, at least in part, manage one or more logins;
store information comprising link service parameter information in the data structure for maintaining initiator-target communications via a link;
receive a login request for a login comprising link service parameter information for maintaining initiator-target communications via a link;
compare the link service parameter information of the login request to the link service parameter information stored in the data structure;
determine, based at least in part on said comparing, to utilize the data structure to manage the login; and
manage the login with the network interface chip using at least the data structure.

11. The network interface of claim 10, wherein
the link service parameter information is negotiated during a login interaction between an initiator and a target.

12. The network interface of claim 10, wherein
managing the login comprises determining how to engage in communications via an intervening communication network.

13. The network interface of claim 10, wherein said at least one module is operable to receive configuration information from a host of the mass storage target system at the network interface chip that indicates to the network interface chip whether login control data structures can only be used in a one-to-one relationship with a respective initiator or whether login control data structures may be used in a one-to-many relationship with a plurality of initiators.

14. The network interface of claim 13, wherein said at least one module is operable to receive the configuration information from the host during initialization of the mass storage target system.

15. The network interface of claim 13, wherein said at least one module is operable to receive the configuration information from the host during post-initialization operation of the mass storage target system.

16. The network interface of claim 10, wherein said at least one module is operable to receive at the network interface chip a first message from a host of the mass storage target system, the first message for directing the network interface chip to transmit a second message to an initiator, the first message comprising information identifying the data structure and information identifying the initiator.

17. The network interface of claim 10, wherein said at least one module is operable to transmit a second message from the network interface chip to a host of the mass storage target system regarding a first message received by the network interface chip from an initiator, the second message comprising information identifying the data structure and information identifying the initiator.

18. The network interface of claim 10, wherein the service parameter information stored in the data structure comprises an entire set of service parameter information defined for a communication protocol.

19. A non-transitory machine-readable storage medium embodying program code for interfacing a mass storage target system with a plurality of initiators, the program code comprising a set of instructions, stored on the machine-readable medium, that when executed by a processor, cause the processor to at least:
create a data structure in local memory of a network interface chip to, at least in part, manage one or more logins;
store information comprising link service parameter information in the data structure for maintaining initiator-target communications via a link;
receive a login request for a login comprising link service parameter information for maintaining initiator-target communications via a link;
compare the link service parameter information of the login request to the link service parameter information stored in the data structure;
determine, based at least in part on said comparing, to utilize the data structure to manage the login; and
manage the login with the network interface chip using at least the data structure.

20. The non-transitory machine-readable storage medium of claim 19, wherein
the link service parameter information is negotiated during a login interaction between an initiator and a target.

* * * * *